(12) United States Patent
Isota et al.

(10) Patent No.: US 11,810,724 B2
(45) Date of Patent: Nov. 7, 2023

(54) MULTILAYER CERAMIC CAPACITOR

(71) Applicant: Murata Manufacturing Co., Ltd., Nagaokakyo (JP)

(72) Inventors: Shinya Isota, Nagaokakyo (JP); Takehisa Sasabayashi, Nagaokakyo (JP); Kazuhisa Uchida, Nagaokakyo (JP); Hideyuki Hashimoto, Nagaokakyo (JP); Yuta Oshima, Nagaokakyo (JP)

(73) Assignee: MURATA MANUFACTURING CO., LTD, Kyoto (JP)

( * ) Notice: Subject to any disclaimer, the term of this patent is extended or adjusted under 35 U.S.C. 154(b) by 189 days.

(21) Appl. No.: 17/411,147

(22) Filed: Aug. 25, 2021

(65) Prior Publication Data

US 2022/0102076 A1   Mar. 31, 2022

(30) Foreign Application Priority Data

Sep. 30, 2020   (JP) .................................. 2020-165987

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS 5,835,340 A   11/1998   Wada et al.
6,245,433 B1   6/2001   Nakamura et al.
(Continued)

FOREIGN PATENT DOCUMENTS

CN   1421881 A   6/2003
JP   10-50545 A   2/1998
(Continued)

OTHER PUBLICATIONS

Office Action in JP2020-165987, dated Apr. 4, 2023, 2 pages.
Office Action in CN202110993386.0, dated Jun. 6, 2023, 8 pages.
Office Action in KR10-2021-0112190, dated Sep. 8, 2023, 4 pages.

*Primary Examiner* — Nathan Milakovich
(74) *Attorney, Agent, or Firm* — KEATING & BENNETT, LLP

(57) ABSTRACT

A multilayer ceramic capacitor includes a base body including first and second main surfaces, first and second side surfaces, first and second end surfaces, and dielectric layers and internal electrode layers, and external electrodes at the first and second end surfaces, and electrically connected to the internal electrode layers. The base body includes an inner layer, first and second outer layers, first and second side margin portions. The dielectric layers in the inner layer and the first and second outer layers include main crystal grains including barium and titanium, and with respect to 100 parts by mol of titanium, nickel in an amount of about 0.2 to about 3.0 parts by mol, and at least one rare earth element selected from yttrium, praseodymium, neodymium, samarium, europium, gadolinium, terbium, dysprosium, holmium, erbium, thulium, ytterbium, and lutetium in an amount of about 0.6 parts to about 2.0 parts by mol.

20 Claims, 6 Drawing Sheets

(51) Int. Cl.
*H01G 4/12* (2006.01)
*H01G 4/012* (2006.01)

(56) References Cited

U.S. PATENT DOCUMENTS

| | | | |
|---|---|---|---|
| 2003/0062112 A1 | 4/2003 | Matsumoto | |
| 2014/0313634 A1 | 10/2014 | Yoon et al. | |
| 2015/0299048 A1* | 10/2015 | Yoon | H01G 4/1227 |
| | | | 501/138 |
| 2015/0340156 A1* | 11/2015 | Masunari | H01G 4/1227 |
| | | | 361/301.4 |
| 2016/0002111 A1* | 1/2016 | Yoon | H01G 4/1227 |
| | | | 501/138 |
| 2016/0086735 A1* | 3/2016 | Yoon | B32B 18/00 |
| | | | 501/137 |
| 2020/0051742 A1* | 2/2020 | Park | C04B 35/4682 |
| 2020/0258684 A1* | 8/2020 | Yun | H01G 4/228 |
| 2023/0141461 A1* | 5/2023 | Cha | H01G 4/232 |
| | | | 361/301.4 |

FOREIGN PATENT DOCUMENTS

| | | |
|---|---|---|
| JP | 3334607 B2 | 10/2002 |
| JP | 2003173925 A | 6/2003 |
| JP | 2014210693 A | 11/2014 |
| JP | 2017011172 A | 1/2017 |
| KR | 1019980009197 A | 4/1998 |

\* cited by examiner

MULTILAYER CERAMIC CAPACITOR

CROSS REFERENCE TO RELATED APPLICATIONS

This application is based on and claims the benefit of priority from Japanese Patent Application No. 2020-165987, filed on Sep. 30, 2020, the contents of which are incorporated herein by reference.

BACKGROUND OF THE INVENTION

1. Field of the Invention

The present invention relates to a multilayer ceramic capacitor.

2. Description of the Related Art

With the miniaturization of electronic devices, such as mobile phones, and high speed CPUs, the demand for multilayer ceramic capacitors (MLCC) has been increasing. A multilayer ceramic capacitor, which includes dielectric layers and internal electrode layers stacked alternately in the structure, is small, yet exhibits a large capacitance due to thin dielectric layers exhibiting high permittivity. Multilayer ceramic capacitors containing various materials are known, and those containing barium titanate ($BaTiO_3$)-based compounds in dielectric layers and a base metal such as nickel (Ni) in internal electrodes are widely used because they are inexpensive and exhibit enhanced characteristics.

In obtaining the miniaturization and large capacitance of the multilayer ceramic capacitor, it is important to reduce the thickness of the dielectric layers. However, reducing the thickness of the dielectric layers may lead to a reduction in the insulation resistance between the internal electrode layers, which results in a problematic degradation of reliability. In order to address such a problem, there has been proposed a technique for improving insulation resistance and reliability by adding an additive, such as rare earth element (Re) or magnesium (Mg), to dielectric layers made of a $BaTiO_3$-based compound.

For example, Japanese Patent No. 3334607 discloses a dielectric ceramic composition containing barium titanate; at least one selected from europium oxide, gadolinium oxide, terbium oxide, dysprosium oxide, holmium oxide, erbium oxide, thulium oxide, and ytterbium oxide; barium zirconate; magnesium oxide; and manganese oxide. The composition contains a main component represented by a specific compositional formula (claim 1 of Japanese Patent No. 3334607). Furthermore, Japanese Patent No. 3334607 discloses that the above ceramic composition is applied to dielectric ceramic layers of a multilayer ceramic capacitor including internal electrodes made of nickel or a nickel alloy, and also discloses that, when used at a high electric field strength, the product of insulation resistance and capacitance (CR product) is high, dielectric strength is high, and weather resistance performance, such as high temperature load and moisture resistance load, is excellent (see, for example, claim 4 and paragraph [0007] of Japanese Patent No. 3334607).

Meanwhile, multilayer ceramic capacitors include margin portions on their side surfaces where the internal electrode layers are not present. These margin portions do not contribute to the capacitance. In this regard, a technique for manufacturing a multilayer ceramic capacitor has been proposed, where each of the precursor of the internal electrode layers and the precursor of the dielectric layers are laminated. Then, precursors of the side margin portions are attached to the side surfaces of the multilayer body, followed by firing the entire multilayer body, to manufacture a multilayer ceramic capacitor having side margin portions on the side surfaces. Providing the side margin portions independently from the multilayer body allows the thickness of the side margin portions and the thickness variation thereof to be reduced. This makes it possible to obtain a multilayer ceramic capacitor having a large capacitance and to achieve a reduction in the capacitance variation.

For example, Japanese Unexamined Patent Application Publication No. H10-050545 discloses a multilayer ceramic capacitor composed of a capacitive main body including a plurality of dielectric ceramic layers and a plurality of internal electrodes, each of the dielectric ceramic layers and the internal electrodes being stacked alternately; and external electrodes provided on opposed end surfaces of the capacitor main body and connected to the internal electrodes. The capacitor further includes a pair of ceramic side margin portions provided on the side surfaces of the capacitor main body on which the external electrodes are not provided (claim 1 of Japanese Unexamined Patent Application Publication No. H10-050545). Furthermore, Japanese Unexamined Patent Application Publication No. H10-050545 discloses that the dielectric ceramic layers are produced from a dielectric material powder including barium titanate, yttrium oxide, and magnesium oxide, and that the side margin portions are produced from a dielectric material powder with an addition of calcium zirconate or barium zirconate (paragraphs [0027] to [0030] of Japanese Unexamined Patent Application Publication No. H10-050545).

With the advancement of electronic components and electronic apparatuses, further miniaturization and larger capacitance of the multilayer ceramic capacitor are expected. Furthermore, the demand for a reliability improvement is continuing to increase, as the application of the multilayer ceramic capacitor expands. Accordingly, it is requested that a multilayer ceramic capacitor is provided with thinner layers, yet having high insulating properties, and further having superior reliability with little deterioration even under high humidity and high temperature. Although the conventionally proposed techniques have a certain effect, there is still room for improvement.

In view of such problems, the inventors of preferred embodiments of the present invention have conducted extensive investigations. As a result, the inventors of preferred embodiments of the present invention have discovered that, in manufacturing multilayer ceramic capacitors that include side margin portion, protrusions made of magnesium (Mg) and nickel (Ni) are likely to form at the interface between the dielectric layers and the internal electrode layers during the firing process, and that these protrusions deteriorate insulating properties and reliability. The inventors of preferred embodiments of the present invention have further discovered that controlling the content of rare earth element (Re), nickel (Ni), and magnesium (Mg) within a specific region makes it possible to provide multilayer ceramic capacitors with high insulating properties and excellent reliability under high temperature and high humidity conditions.

SUMMARY OF THE INVENTION

Preferred embodiments of the present invention provide multilayer ceramic capacitors that each have high insulating properties and excellent reliability under high humidity and high temperature.

The description of preferred embodiments of the present invention encompasses the following definitions. In the description of preferred embodiments of the present invention, the expression "X to Y" includes numerical values at both ends thereof. In other words, "X to Y" is synonymous with "X or more and Y or less".

A preferred embodiment of the present invention provides a multilayer ceramic capacitor including a base body including a first main surface and a second main surface opposed to each other in a thickness direction, a first side surface and a second side surface opposed to each other in a width direction, a first end surface and a second end surface opposed to each other in a length direction, and a plurality of dielectric layers and a plurality of internal electrode layers laminated in the thickness direction; and a pair of external electrodes, respectively at the first end surface and the second end surface, and electrically connected to the plurality of internal electrode layers; wherein, when the base body is divided into an inner layer defined by an internal electrode layer closest to the first main surface and an internal electrode layer closest to the second main surface among the plurality of internal electrode layers, a first outer layer defined by the inner layer and the first main surface, a second outer layer defined by the inner layer and the second main surface, a first side margin portion defined by the inner layer, the first outer layer, the second outer layer, and the first side surface, and a second side margin portion defined by the inner layer, the first outer layer, the second outer layer, and the second side surface, the dielectric layers in each of the inner layer, the first outer layer, and the second outer layer include main crystal grains including barium and titanium, and the dielectric layers in each of the inner layer, the first outer layer, and the second outer layer further include, with respect to 100 parts by mol of titanium, nickel in an amount of about 0.2 parts by mol or more and about 3.0 parts by mol or less, and at least one rare earth element selected from yttrium, praseodymium, neodymium, samarium, europium, gadolinium, terbium, dysprosium, holmium, erbium, thulium, ytterbium, and lutetium in an amount of about 0.6 parts by mol or more and about 2.0 parts by mol or less; and, when an inner region is defined as a region surrounded by planes spaced inward by about 50 μm from an interface at which each of the first outer layer, the second outer layer, the first side margin portion, and the second side margin portion is in contact with the inner layer, a magnesium content with respect to 100 parts by mol of titanium is about 0.05 parts by mol or less in the dielectric layers in the inner region.

According to preferred embodiments of the present invention, it is possible to provide multilayer ceramic capacitors each having high insulating properties and having excellent reliability under high humidity and high temperature.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. The present invention is not limited to the following preferred embodiments, and various modifications can be made without changing the gist of the present invention.

(1) Multilayer Ceramic Capacitor

A multilayer ceramic capacitor according to a preferred embodiment includes a base body including a first main surface and a second main surface opposed to each other in a thickness direction, a first side surface and a second side surface opposed to each other in a width direction, and a first end surface and a second end surface opposed to each other in a length direction. The multilayer ceramic capacitor further includes a plurality of dielectric layers and a plurality of internal electrode layers laminated in the thickness direction, and a pair of external electrodes, respectively provided at the first end surface and the second end surface, and electrically connected to the plurality of the internal electrode layers. The base body is divided into an inner layer defined by an internal electrode layer closest to the first main surface and an internal electrode layer closest to the second main surface among the plurality of internal electrode layers; a first outer layer defined by the inner layer and the first main surface; a second outer layer defined by the inner layer and the second main surface; a first side margin portion defined by the inner layer, the first outer layer, the second outer layer, and the first side surface; and a second side margin portion defined by the inner layer, the first outer layer, the second outer layer, and the second side surface. The dielectric layers in each of the inner layer, the first outer layer, and the second outer layer include main crystal grains including barium (Ba) and titanium (Ti). The dielectric layers in each of the inner layer, the first outer layer, and the second outer layer further include, with respect to 100 parts by mol of titanium (Ti), nickel (Ni) in an amount of about 0.2 parts by mol or more and about 3.0 parts by mol or less, and at least one rare earth element (Re) selected from yttrium (Y), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) in an amount of about 0.6 parts by mol or more and about 2.0 parts by mol or less. When an inner region is defined as a region surrounded by planes spaced inward by about 50 μm from an interface at which each of the first outer layer, the second outer layer, the first side margin portion, and the second side margin portion is in contact with the inner layer, a magnesium (Mg) content with respect to 100 parts by mol of titanium (Ti) is about 0.05 parts by mol or less in the dielectric layers in the inner region.

Figure 1:
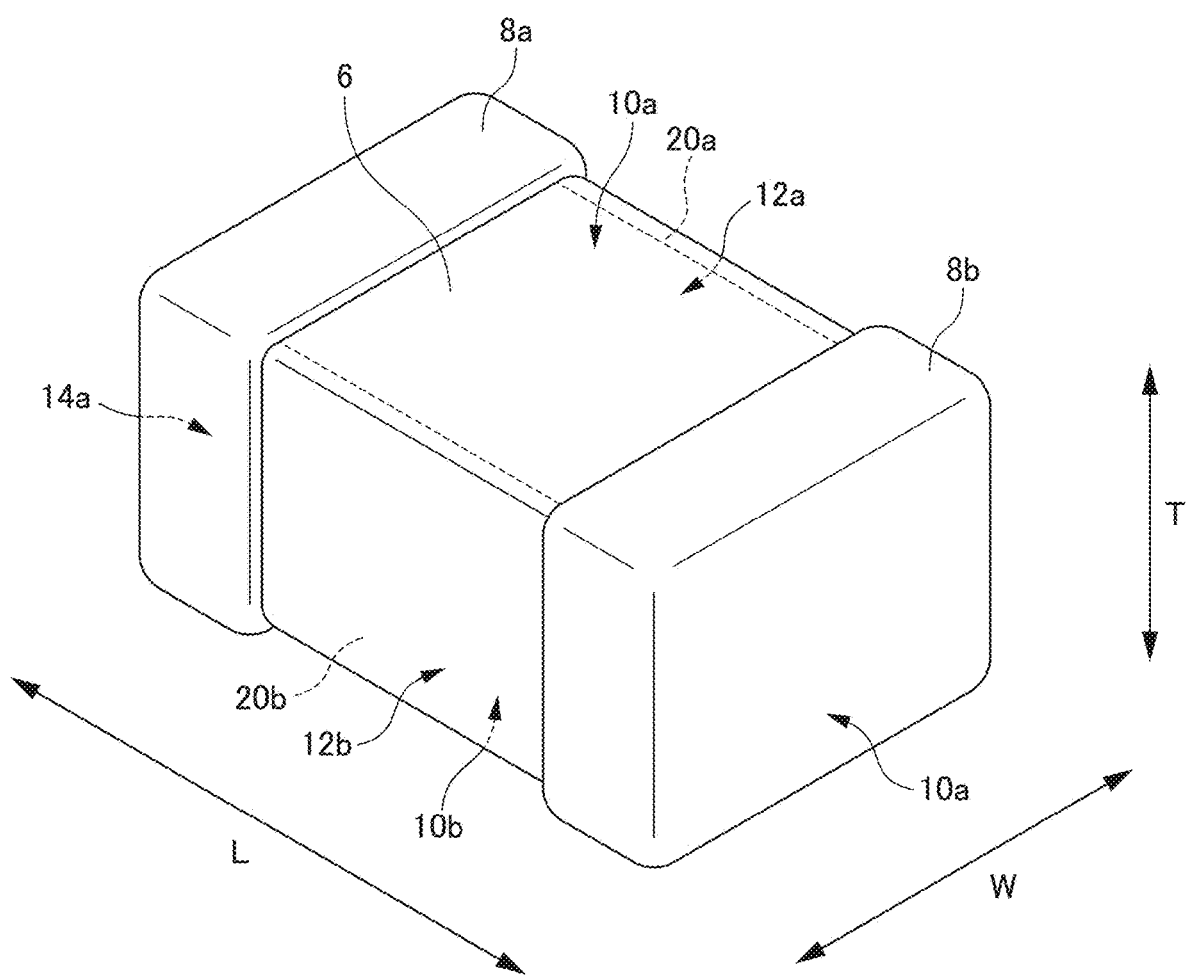
FIG. 1 is a perspective view showing an outer shape of a multilayer ceramic capacitor according to a preferred embodiment of the present invention.
Figure 2:
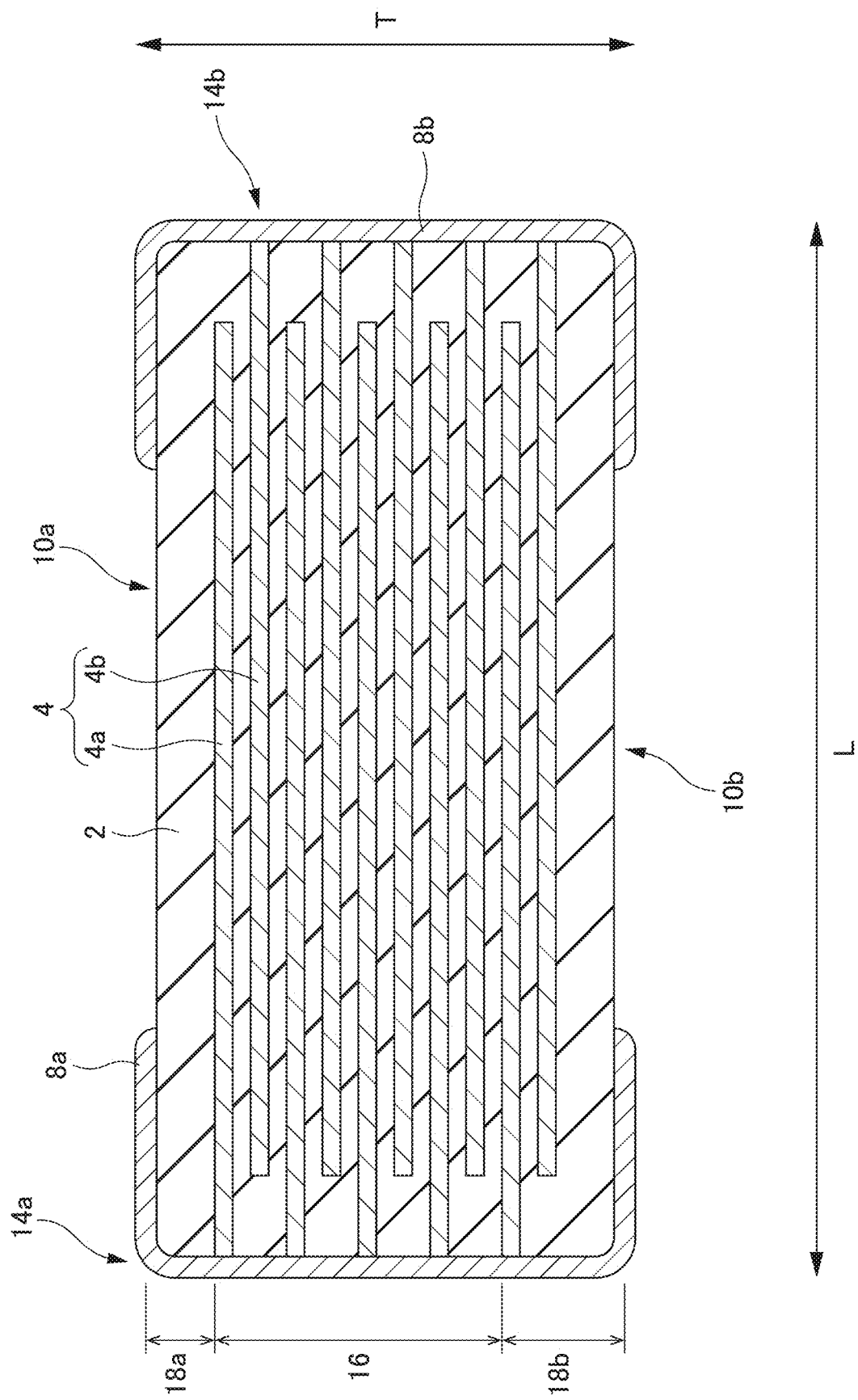
FIG. 2 is a cross-sectional view schematically showing an internal structure of the multilayer ceramic capacitor shown in FIG. 1.
Figure 3:
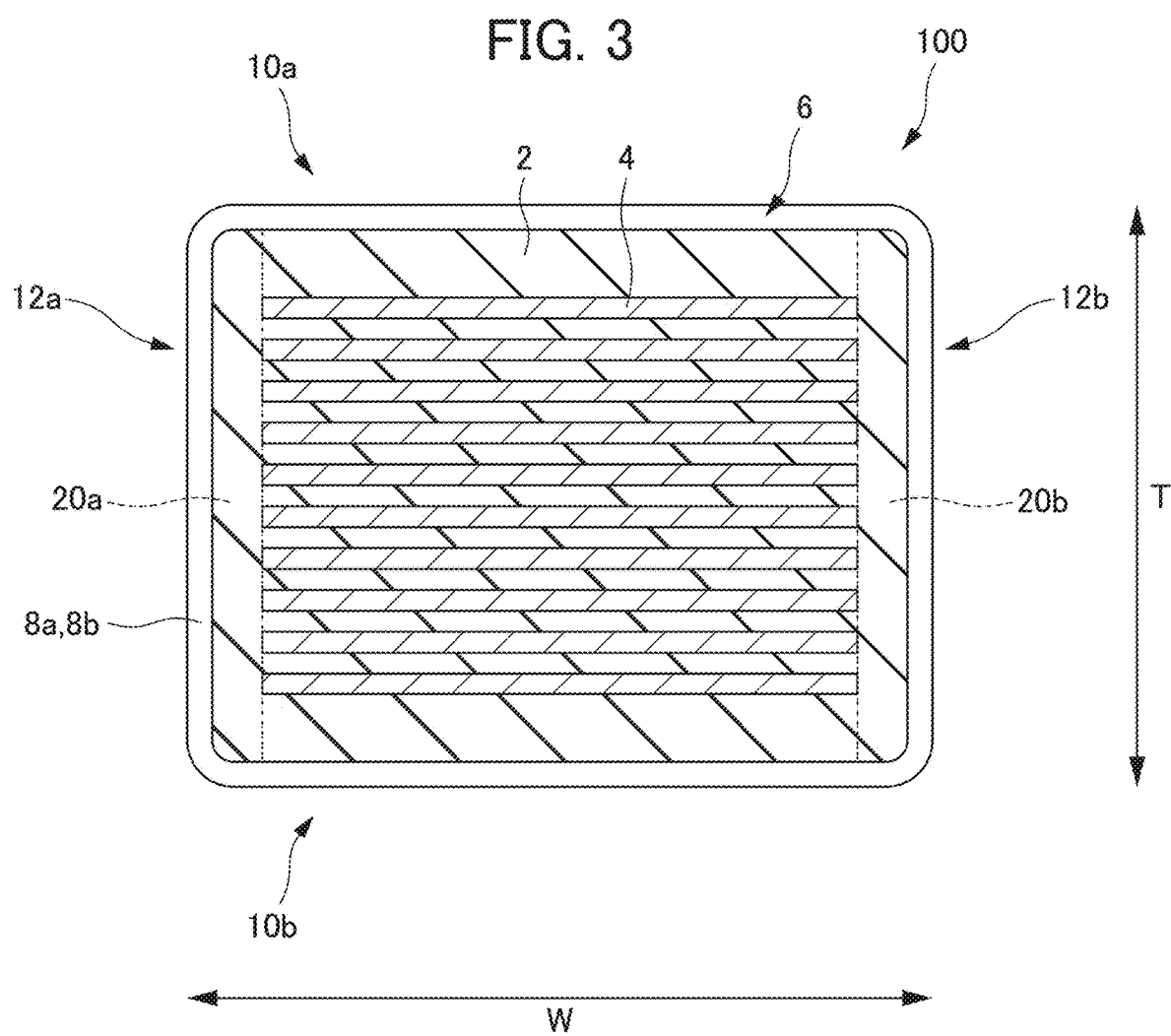
FIG. 3 is a cross-sectional view schematically showing the internal structure of the multilayer ceramic capacitor shown in FIG. 1.

A preferred embodiment of a multilayer ceramic capacitor according to the present invention will be described with reference to FIGS. 1 to 3. FIG. 1 is a perspective view showing the outer shape of the multilayer ceramic capacitor according to the present preferred embodiment. FIGS. 2 and 3 are views each showing a cross section of the multilayer ceramic capacitor according to the present preferred embodiment. A multilayer ceramic capacitor (100) includes a base body (6) that includes a plurality of laminated dielectric layers (2) and a plurality of laminated internal electrode layers (4), and a pair of external electrodes (8a and 8b), each provided on the end surfaces (14a and 14b) of the base body (6). The multilayer ceramic capacitor (100) and the base body (6) each has a rectangular or substantially rectangular parallelepiped shape. Here, the rectangular or substantially rectangular parallelepiped includes a rectangular parallelepiped shape, and a rectangular parallelepiped shape with rounded corners and/or edges, for example. The multilayer ceramic capacitor (100) and the base body (6) include a first main surface (10a) and a second main surface (10b) opposed to each other in a thickness direction T, a first side surface (12a) and a second side surface (12b) opposed to each other in a width direction W, and a first end surface (14a) and a second end surface (14b) opposed to each other in a length direction L. Here, the thickness direction T refers to a direction in which the plurality of dielectric layers (2) and the plurality of internal electrode layers (4) are laminated. The length direction L refers to a direction orthogonal or substantially orthogonal to the thickness direction T, and orthogonal or substantially orthogonal to the end surfaces (14a and 14b) on which the external electrodes (8a and 8b) are respectively provided. The width direction W refers to a direction orthogonal or substantially orthogonal to the thickness direction T and the length direction L. The thickness direction T and the width direction W define a WT plane. The width direction W and the length direction L define an LW plane. The length direction L and the thickness direction T define an LT plane.

The external electrodes (8a and 8b) include a first external electrode (8a) provided on the first end surface (14a), and a second external electrode (8b) provided on the second end surface (14b). The first external electrode (8a) wraps around the first end surface (14a), and may partially cover the first main surface (10a), the second main surface (10b), the first side surface (12a), and the second side surface (12b). The second external electrode (8b) wraps around the second end surface (14b), and may partially cover the first main surface (10a), the second main surface (10b), the first side surface (12a), and the second side surface (12b). However, the first external electrode (8a) and the second external electrode (8b) are not in contact with each other, and thus are electrically separated.

The internal electrode layers (4) include a plurality of first internal electrode layers (4a) and a plurality of second electrode layers (4b). The plurality of first internal electrode layers (4a) extend to the first end surface (14a), and are electrically connected to the first external electrode (8a). The plurality of second internal electrode layers (4b) extend to the second end surface (14b), and are electrically connected to the second external electrode (8b). The first internal electrode layer (4a) and the second internal electrode layer (4b), opposed to each other the dielectric layer (2) interposed therebetween, are not electrically connected. Therefore, an application of a voltage between the first internal electrode layer (4a) and the second internal electrode layer (4b) through the external electrodes (8a, 8b) produces an accumulation of electrical charge. The accumulated charge produces a statistic capacitance, which defines a capacitance element.

The base body (6) can be divided (classified) into an inner layer (16), a first outer layer (18a), a second outer layer (18b), a first side margin portion (20a), and a second side margin portion (20b). The inner layer (16) is a region defined by the internal electrode layer located closest to the first main surface (10a) and the internal electrode layer located closest to the second main surface (10b) among the plurality of internal electrode layers (4). That is, the inner layer (16) is a region sandwiched between the uppermost internal electrode layer and the lowermost internal electrode layer, and thus defines and functions as a capacitance element. The first outer layer (18a) is a region defined by the inner layer (16) and the first main surface (10a). The second outer layer (18b) is a region defined by the inner layer (16) and the second main surface (10b). That is, the first outer layer (18a) can be referred to as a region sandwiched between an internal electrode layer located closest to the first main surface (10a), and the first main surface (10a). The second outer layer (18b) can be referred to as a region sandwiched between an internal electrode layer located closest to the second main surface (10b), and the second main surface (10b). The inner layer (16) and the outer layers (18a and 18b) can be regarded as a multilayer body in which the dielectric layers (2) and the internal electrode layers (4) are laminated (stacked).

The first side margin portion (20a) is a region defined by each of the inner layer (16), the first outer layer (18a) and the second outer layer (18b), and the first side surface (12a). The second side margin portion (20b) is a region defined by each of the inner layer (16), the first outer layer (18a) and the second outer layer (18b), and the second side surface (12b). That is, the side margin portions (20a and 20b) respectively extend along the side surfaces (12a and 12b), and thus can be regarded as regions that do not include the internal electrode layers (4).

The size of the multilayer ceramic capacitor 100 is not particularly limited. However, it is preferable that the size is, for example, about 0.2 mm or more and about 1.2 mm or less in the length direction L, about 0.1 mm or more and about 0.7 mm or less in the width direction W, and about 0.1 mm or more and about 0.7 mm or less in the lamination (thickness) direction T.

Dielectric Layer

The dielectric layers are made of ceramics. The dielectric layers in each of the inner layer, the first outer layer, and the second outer layer include, for example, main crystal grains including barium (Ba) and titanium (Ti). More specifically, the main crystal grains include barium titanate ($BaTiO_3$)-based compound. $BaTiO_3$ is a perovskite oxide represented by the general formula: $ABO_3$. $BaTiO_3$ is a ferroelectric material having a tetragonal crystal structure at room-temperature and high permittivity. Accordingly, the dielectric ceramic including $BaTiO_3$-based compound as the main component can have high permittivity, and thus provides a large capacitance to the capacitor. In this disclosure, the main component refers to a component having the highest content ratio in the ceramic. The content ratio of the main component may be about 50% by mass or more, may be about 60% by mass or more, may be about 70% by mass or more, may be 80% by mass or more, and may be about 90% by mass or more, for example.

The barium titanate ($BaTiO_3$)-based compound is not particularly limited as long as it is a perovskite oxide that mainly includes barium (Ba) and titanium (Ti). That is, the compound may be $BaTiO_3$, for example. Alternatively, Ba and/or Ti included in $BaTiO_3$ may be partially substituted with other element(s). In particular, for example, Ba may be partially substituted with Sr and/or Ca, and Ti may be partially substituted with Zr and/or Hf. Furthermore, the ratio of the A-site element(s) (Ba, Sr, Ca, etc.) and the B-site element(s) (Ti, Zr, Hf, etc.) of $BaTiO_3$ compound is not strictly limited to 1:1. As long as the perovskite crystal structure is maintained, the ratio of the A-site element(s) to the B-site element(s) may deviate from 1:1.

The dielectric layers in each of the inner layer, the first outer layer, and the second outer layer include at least one rare earth element (Re) selected from the group consisting of yttrium (Y), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) in an amount of about 0.6 mol parts or more and about 2.0 mol parts or less with respect to 100 mol parts of titanium (Ti). Rare earth element (Re) is an additive component added to the dielectric layers. The dielectric layers may include, for example, a single type of the aforementioned Re, or may include a plurality of types in combination. Re is not limited to its existing form as long as at least a portion of Re is included in the main crystal grains. Re may be included only in the main crystal grains, or may be included in grain boundary phases or triple points in addition to the main crystal grains, for example. Re included in the main crystal grains may occupy the Ba site (A site) of $BaTiO_3$-based compound, the Ti site (B site), or both sites, for example.

The addition of rare earth element (Re) to the dielectric layers makes it possible to control various characteristics. In $BaTiO_3$, $Ba^{2+}$ having a large ionic radius occupies an A site, while $Ti^{4+}$ having a small ionic radius occupies a B site. Re usually becomes a positive trivalent ion ($R^{3+}$) whose radius is intermediate between $Ba^{2+}$ and $Ti^{4+}$. Re, therefore, forms a solid solution in $BaTiO_3$ and replaces either or both of Ba and Ti. Re dissolved in a Ba site (A site) acts as a donor, while Re dissolved in a Ti site (B site) acts as an acceptor. The addition of Re having such a function makes it possible to alter the characteristics of the dielectric layers.

In particular, the addition of rare earth element (Re) improves high-temperature load life, and improves reliability. That is, $BaTiO_3$-based dielectric layers include a large amount of oxygen vacancies formed in the main component grains during a firing process. The oxygen vacancies are positively charged, and make a path for an electric charge. If a large number of oxygen vacancies exist, the amount of the migrating charges increases, which is likely to cause a deteriorated insulation resistance. In particular, under a high temperature environment, oxygen vacancies tend to migrate to the vicinity of the negative electrode. Accordingly, the amount of oxygen vacancies increases when a load is applied, which results in a deteriorated insulation resistance. In contrast, the formation of oxygen vacancies and their migration are reduced or prevented by the addition of Re, which acts as a donor and/or an acceptor, to $BaTiO_3$.

The content of rare earth element (Re) is about 0.6 mol parts or more and about 2.0 mol parts or less with respect to 100 mol parts of titanium (Ti). If the Re content is excessively small, the effect of Re is not sufficient, and this results in a lowered reliability (high temperature load characteristics and a lowered humidity resistance load characteristics). The Re content may be about 0.8 mol parts or more, and may be about 1.0 mol parts or more, for example. On the other hand, if the Re content is excessively large, reliability may be reduced and short circuiting between the internal electrode layers may occur. The Re content may be about 1.5 mol parts or less, and may be about 1.0 mol parts or less, for example. Rare earth element (Re) is preferably, for example, at least one selected from gadolinium (Gd), terbium (Tb), dysprosium (Dy), and holmium (Ho), and particularly preferably dysprosium (Dy). These elements have an intermediate ionic radius among the rare earth elements (Re). This helps to develop the functions as donors and acceptors in a balanced manner, and as a result, significantly improves reliability (high temperature load characteristics).

The dielectric layers in each of the inner layer, the first outer layer, and the second outer layer include nickel (Ni) in an amount of about 0.2 mol parts or more and about 3.0 mol parts or less with respect to 100 mol parts of titanium (Ti). Ni is an additive component added to the dielectric layers, and forms a solid solution in the main crystal grains. Ni acts as an acceptor, and is excellent in the ability to trap oxygen vacancies. The addition of Ni, which defines and functions as an acceptor, in an amount of more than about 0.2 mol parts makes it possible to significantly improve the insulating properties (IR, short circuit ratio), and reliability (high temperature load characteristics and humidity resistance load characteristics). The Ni content may be about 0.5 mol parts or more, and may be about 1.0 mol parts or more, for example. However, an excessively-high Ni content would reduce the insulating properties and reliability. The Ni content may be about 2.5 mol parts or less, and may be about 2.0 mol parts or less, for example. It should be noted that Ni is not limited in its existing form as long as at least a portion of Ni is included in the main crystal grains. Ni may be included only in the main crystal grains, or may be included in grain boundary phases and triple points in addition to the main crystal grains, for example.

Figure 4:
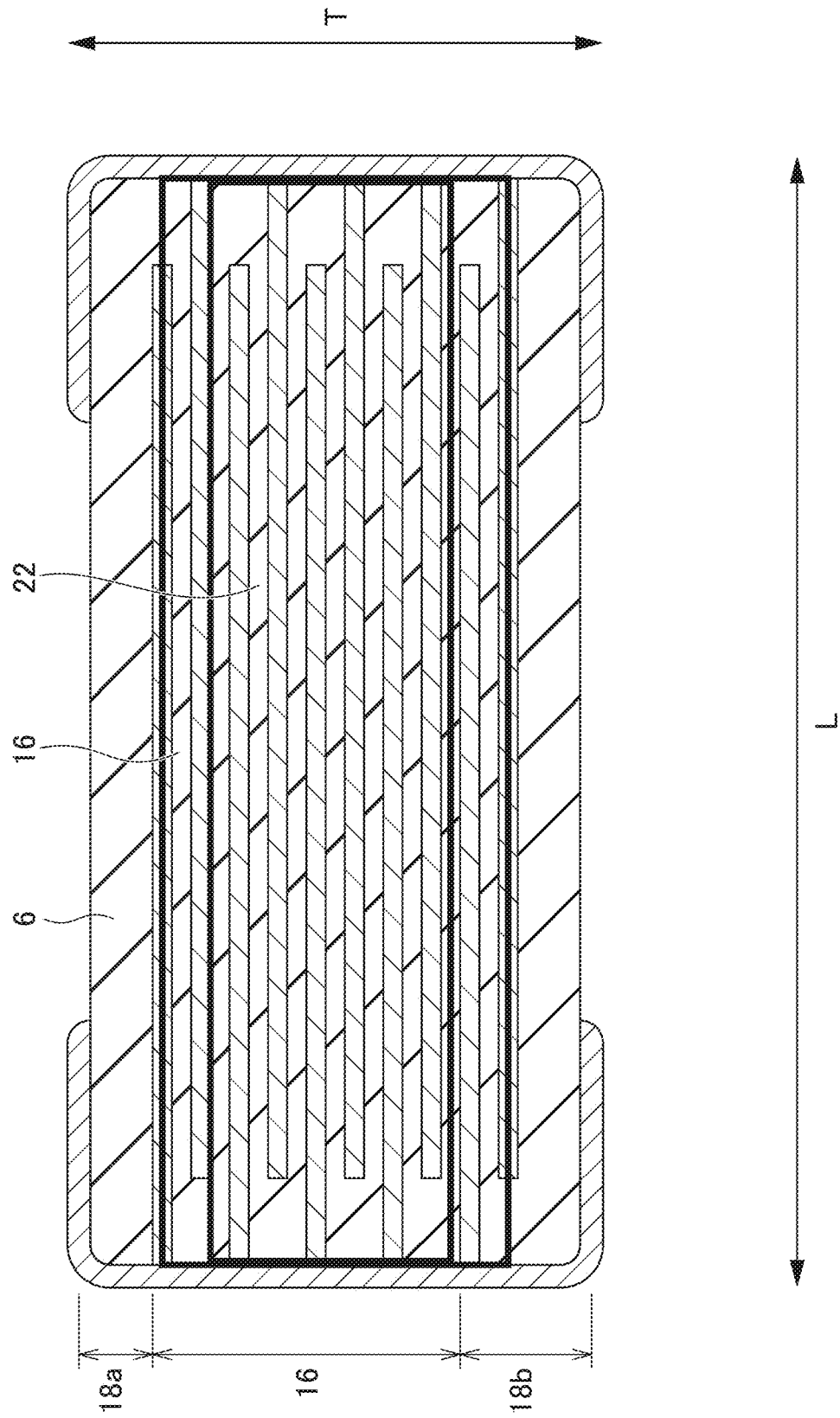
FIG. 4 is a view for explaining an inner layer and an inner region of a multilayer ceramic capacitor according to a preferred embodiment of the present invention.
Figure 5:
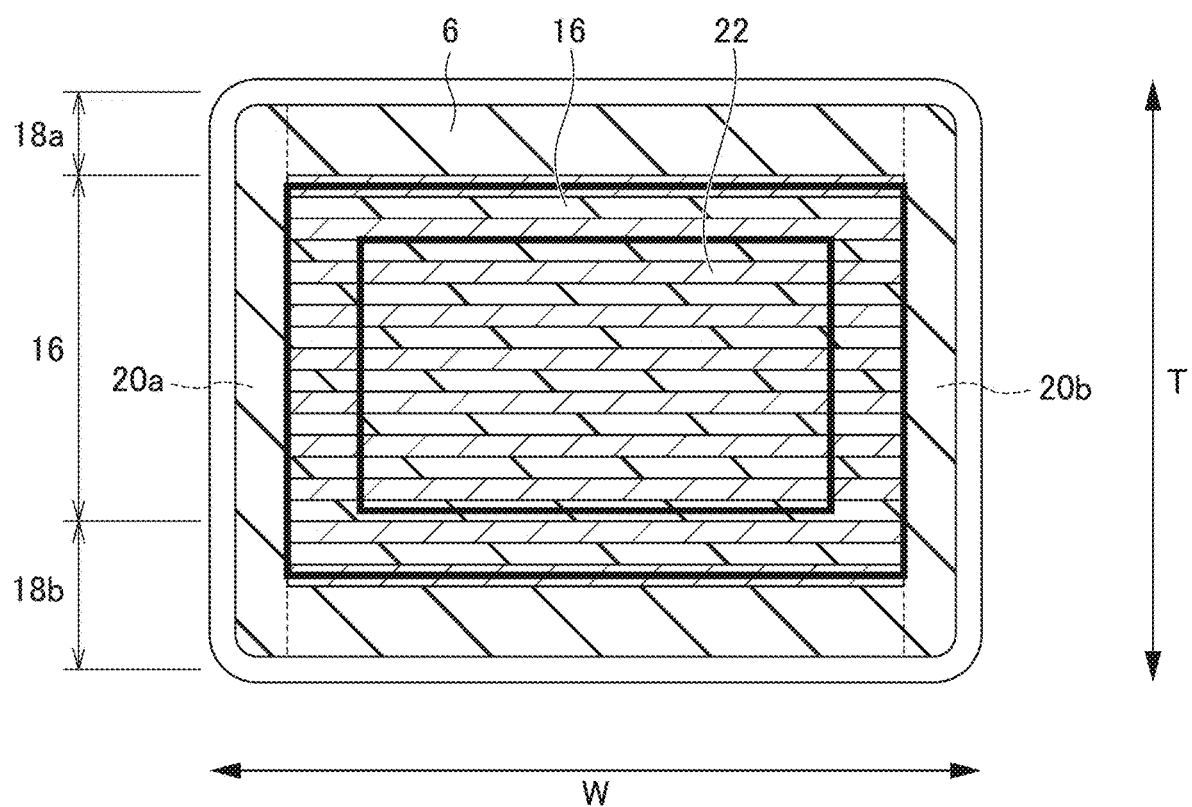
FIG. 5 is a view for explaining the inner layer and the inner region of a multilayer ceramic capacitor according to a preferred embodiment of the present invention.

When an inner region is defined as a region surrounded by planes spaced inward by about 50 μm from the interface at which each of the first outer layer, the second outer layer, the first side margin portion, and the second side margin portion are in contact with the inner layer, the magnesium (Mg) content with respect to 100 mol parts of titanium (Ti) is, for example, about 0.05 mol parts or less (about 500 ppm or less) in the dielectric layers in this inner region. The inner region will be described with reference to FIGS. 4 and 5. The inner region (22) is a virtual region provided inside the inner layer (16). The inner layer (16) is in contact with the first outer layer (18a), the second outer layer (18b), the first side margin portion (20a), and the second side margin portion (20b), each surrounding the inner layer (16) via the four interfaces. Assuming that four planes spaced away inward by about 50 μm from the interfaces in the inner layer (16), the inner region (22) is surrounded by the assumed planes and the end surfaces (14a and 14b). In other words, the inner region (22) lies inside the inner layer (16), excluding portions within about 50 μm from the four interfaces surrounding the inner layer (16).

As described above, in the multilayer ceramic capacitor including Ni internal electrode layers, if the dielectric layer includes Mg, then, Mg reacts with Ni included in the internal electrode layers. Accordingly, protrusions including Mg and Ni (Mg—Ni protrusion) may be provided at the interfaces between the internal electrode layers and the dielectric layers. Such protrusions reduce the thickness of the dielectric layers, which may cause short circuiting between the internal electrode layers. In particular, in a case that the dielectric layers are originally thin, short circuiting is problematic, and results in deterioration of insulating properties and reliability. In contrast, limiting the Mg content in the dielectric layers to about 0.05 mol parts (about 500 ppm) or less makes it possible to reduce or prevent the formation of Mg—Ni protrusions and the local thinning of the dielectric layers, and thus, reduce or prevent the deterioration of the insulating properties and reliability associated therewith. Ni, which can trap the oxygen vacancies and act as an acceptor, makes a solid solution in the main crystal grains including Ni. Therefore, even if the Mg content in the dielectric layers is restricted, this does not result in reliability degradation due to insufficient acceptors. The Mg content may be about 0.03 mol parts (300 ppm) or less, for example.

Preferably, the dielectric layers in each of the first outer layer, the second outer layer, and the inner layer include, for example, manganese (Mn) in an amount of about 0.08 mol parts or more and about 0.40 mol parts or less, silicon (Si) in an amount of about 0.6 mol parts or more and about 2.0 mol parts or less, aluminum (Al) in an amount of about 0.04 mol parts or more and about 0.30 mol parts or less, and vanadium (V) in an amount of about 0.04 mol parts or more and about 0.20 mol parts or less, with respect to 100 mol parts of titanium (Ti). Mn, Si, Al and V are additive components in the dielectric layer. The dielectric layers including Mn, Si, Al and V in the amounts described above enable more improved reliability (high temperature load characteristics). The Mn content may be about 0.08 mol parts or more and about 0.20 mol parts or less, the Si content may be about 0.6 mol parts or more and about 1.0 mol parts or less, the Al content may be about 0.04 mol parts or more and about 0.15 mol parts or less, and the V content may be about 0.04 mol parts or more and about 0.12 mol parts or less, for example.

The dielectric layers may include additive components other than nickel (Ni), rare earth element (Re), manganese (Mn), silicon (Si), aluminum (Al), and vanadium (V). Examples of other additive components include zirconium (Zr), hafnium (Hf), and calcium (Ca). In addition, inevitable impurities which have been incorporated during the manufacturing process may be included. Examples of inevitable impurities include zirconium (Zr), iron (Fe), and cobalt (Co).

Preferably, the dielectric layers in each of the first outer layer, the second outer layer, and the inner layer include, for example, barium (Ba) in an amount of about 99.5 mol parts or more and about 101.5 mol parts or less with respect to 100 mol parts of titanium (Ti). Limiting the Ba content within this range further improves reliability (high temperature load characteristics). The Ba content is more preferably about 100.0 mol parts or more and about 101.0 mol parts or less, for example.

Preferably, the main crystal grains of the dielectric layers in each of the first outer layer, the second outer layer, and the inner layer include Ni-containing grains, and the number ratio of the Ni-containing grains in the main crystal grains is about 4% or more, for example. Here, the Ni-containing grains includes a low-Ni-concentration region and a high-Ni-concentration region. The high-Ni-concentration region has, for example, a Ni concentration that is about 1.3 times or more than that of the low-Ni-concentration region. In other words, Ni makes a solid solution in at least a portion of the main crystal grains. At least a portion of the main crystal grains in which Ni is dissolved has a distribution of Ni concentration in the grains, and is divided into the low-Ni-concentration region and the high-Ni-concentration region. The number ratio of Ni-containing grains of about 4% or more makes it possible to further improve the insulating properties (IR, short circuit ratio) and reliability (high temperature load characteristics and moisture resistance load resistance characteristics). The number ratio of the Ni-containing grains is more preferably about 7% or more, for example. The upper limit for the number is not particularly limited. Typically, however, it is about 20% or less, for example.

The Ni-containing grains are not particularly limited in terms of distribution of the Ni concentration as long as the grains include the low-Ni-concentration region and the high-Ni-concentration region. However, core-shell grains are preferable. In the core-shell grains, the high-Ni-concentration region occupies a core portion while the low-Ni-concentration region occupies a shell layer. In this case, there may be a single core portion in the grains, or there may be two or more. The entire core portion may be covered with the shell layer. Alternatively, the core portion may be partially exposed at the grain surface. Preferably, the Ni-containing grains include the high-Ni-concentration region in an area ratio of about 9% or more, for example. This makes it possible to achieve the advantageous effects of improving the insulating properties and high temperature reliability.

Preferably, for example, the content of the rare earth element (Re) with respect to 100 mol parts of titanium (Ti) in the high-Ni-concentration region is about 1.3 times or more than the content of the rare earth element (Re) with respect to 100 mol parts of titanium (Ti) in the low-Ni-concentration region. To make the Re concentration in the high-Ni-concentration region high in this manner enables the advantageous effects of improving the high temperature reliability to be obtained.

The distributions of Ni concentration and Re concentration in the grains can be measured by making an analysis at a cross section of the dielectric layers with TEM-EDX, and further by making an image analysis of the obtained cross-sectional EDX image. For example, the Ni concentration on the cross-sectional EDX image is quantified and mapped to classify the low-Ni-concentration region and the high-Ni-concentration region in the main crystal grains based on the obtained mapping image. The main crystal grains including both the low concentration region and the high concentration region are regarded as Ni-containing grains, and the number ratio thereof is obtained. The areas of the low-Ni-concentration region and the high-Ni-concentration region on the cross-sectional EDX image can be obtained, and the area ratio of the high-Ni-concentration region can be obtained therefrom.

The thickness of each of the dielectric layers in the inner layer is preferably about 1.0 μm or less, and particularly preferably about 0.4 μm or less, for example. Thinning the dielectric layers makes it possible to improve the capacitance of the multilayer ceramic capacitor. In the multilayer ceramic capacitor of the present preferred embodiment, it is possible to reduce or prevent the formation of the Mg—Ni protrusions at the interface between the dielectric layers and the internal electrode layers. Therefore, thinning does not deteriorate the insulating properties (IR, short-circuit ratio), and reliability can be improved. However, an excessively-thinned dielectric layers make it difficult to reduce or prevent the deterioration of the insulating properties. The thickness of the dielectric layers is typically about 0.15 μm or more, for example.

The thickness of the dielectric layers in each of the first outer layer and the second outer layer is preferably about 9.5 μm or more and about 30 μm or less, and more preferably about 9.5 μm or more and about 20 μm or less, for example. The dielectric layers in the first outer layer and the second outer layer may be a single layer, or may be a multilayer body including a plurality of layers. The dielectric layers in the first outer layer and the dielectric layers in the second outer layer may be the same or may be different in thickness.

The compositions of the dielectric layers in each of the inner layer, the first outer layer, and the second outer layer are not limited as long as they satisfy the requirements described above. For example, the compositions of the dielectric layers in the inner layer may be same as or different from the composition of the dielectric layers in the first outer layer and the second outer layer. The compositions of the dielectric layers in the first outer layer and the second outer layer may be same as or may be different from each other. It is preferable that the total number of layers of the dielectric layers in the inner layer, the first outer layer, and the second outer layer are fifteen or more and seven hundred or less, for example.

Internal Electrode Layer

The internal electrode layers include an electrically-conductive metal. As the electrically-conductive metal, known electrode materials such as, for example, nickel (Ni), copper (Cu), silver (Ag), palladium (Pd), or an alloy including any of them may be used. However, for example, from the viewpoint of cost reduction, Ni or Cu, which is a base metal, is preferable, and Ni is particularly preferable. In the multilayer ceramic capacitor of the present preferred embodiment, the formation of the Mg—Ni protrusions is reduced or prevented even if Ni internal electrode layers are provided, thus, the reliability can be improved. The internal electrode layers may include components other than electrically-conductive metals. Examples of such components include a ceramic component which defines and functions as an additive. Examples of the ceramic component include a $BaTiO_3$-based compound contained in the dielectric layers. The thickness-of the internal electrode layers is preferably about 0.20 μm or more and about 0.80 μm or less, for example. The number of the internal electrode layers is preferably fifteen or more and seven hundred or less, for example.

External Electrodes

For the external electrodes, a known configuration may be provided. For example, it is possible to make a laminated structure including a base layer, a first plated layer, and a second plated layer in this order from the end surface of the multilayer ceramic capacitor. The base layer includes a metal such as nickel (Ni) and copper (Cu), for example. The base layer may include a ceramic powder as an additive, in addition to the metal. The first plated layer is, for example, a nickel (Ni) plated layer. The second plated layer is, for example, a tin (Sn) plated layer. An electrically-conductive resin layer may be provided between the base layer and the first plated layer. The electrically-conductive resin layer includes conductive metal particles such as, for example, copper (Cu), silver (Ag) and nickel (Ni), together with a resin. The external electrodes are not limited in their configuration as long as they are electrically connected to the internal electrode layers and define and function as external input-output terminals.

Side Margin Portion

The multilayer ceramic capacitor of the present preferred embodiment includes the first side margin portion and the second side margin portion on the first side surface and the second side surface, respectively. Since the side margin portions are provided on the side surfaces, the internal electrode layers are not exposed on the side surfaces. Therefore, moisture in the ambient atmosphere is prevented from entering the inside of the multilayer ceramic capacitor through the side surface. Furthermore, providing the side margin portions enables the reduction in the thickness of the margin portions that do not contribute to capacitance, and also enables the strict control of the thickness. This makes it possible to improve the capacitance and reduce the capacitance variation of the multilayer ceramic capacitor. The side margin portions may include main crystal grains made of, for example, a perovskite compound such as a $BaTiO_3$-based compound. In addition to the main crystal grains, an additive component such as, for example, nickel (Ni), a rare earth element (Re), magnesium (Mg), manganese (Mn), silicon (Si), aluminum (Al), or vanadium (V) may be included. Furthermore, inevitable impurities such as, for example, zirconium (Zr) may be included.

The side margin portions may each include a single layer or may be a multilayer body including a plurality of layers, whose plane is parallel or substantially parallel to the side surface of the multilayer ceramic capacitor. In a case where the side margin portion is a multilayer body including a plurality of layers, the side margin portion may include an interface which is transverse in a direction perpendicular or substantially perpendicular to the side surface. An interface may exist between the side margin portions and the inner layer whereas there may not be an interface in a direction parallel or substantially parallel to the main surface. The thickness of the side margin portions is preferably about 15 μm or more and about 55 μm or less, for example.

Preferably, the first side margin portion and the second side margin portion include titanium (Ti), and further, for example, at least one of about 1.00 part by mol or more and about 3.00 parts by mol or less of magnesium (Mg) and about 0.50 part by mol or more and about 2.00 parts by mol or less of manganese (Mn) with respect to 100 parts by mol of titanium (Ti). The total content of magnesium (Mg) and manganese (Mn) is, for example, for example 5.00 parts by mol or less. The Mg content of about 1.00 part by mol or more or the Mn content of about 0.50 part by mol or more enables further improvement of the humidity load resistance characteristics. The Mg content of about 3.00 parts by mol or less and the Mn content of about 2.00 parts by mol or less can reduce or prevent the capacitance reduction.

In this way, a multilayer ceramic capacitor of the present preferred embodiment, where contents of the rare earth element (Re), nickel (Ni), and magnesium (Mg) are controlled within a specific region, exhibits high insulating properties, and excellent reliability under high temperature and high humidity. In particular, the formation of Mg—Ni protrusions can be reduced or prevented in the thinned dielectric layers by limiting Mg and adding Ni instead into the dielectric layers as an additive component, and further controlling Re content within the predetermined range. As a result, it is possible to achieve a large capacitance, and excellent insulating properties and reliability of the multilayer ceramic capacitor compatibly. In addition, the side margin portions provided on the side surfaces make it possible to reduce the capacitance variation.

(2) Method for Manufacturing a Multilayer Ceramic Capacitor

A non-limiting example of a manufacturing method of the multilayer ceramic capacitor of an example preferred embodiment is not limited as long as the above requirements are satisfied. However, it is preferably produced according to the following method. A manufacturing method includes the following steps of providing a main component raw material for dielectric layers (providing step); mixing an additive component raw material with the main component raw material to obtain a dielectric raw material (mixing step); adding and mixing a binder and a solvent to the dielectric raw material to obtain a slurry, and forming a green sheet for the dielectric layers from the obtained slurry (forming step); printing an electrically-conductive paste layer patterned on the surface of the green sheet for the dielectric layers using an electrically-conductive paste for internal electrodes (printing step); manufacturing a laminated block by laminating (stacking) and pressing a plurality of green sheets for the dielectric layers (laminating step); cutting the obtained laminated block into a laminated chip (cutting step); attaching a side margin green body to the side surface of the obtained laminated chip to produce a green base body (side margin forming step); subjecting the obtained green base body to debinding and firing treatments to produce an base body (firing step); and forming external electrodes on the obtained base body to manufacture a multilayer ceramic capacitor (external electrode forming step). Details of each step will be described below.

Providing Step

In the providing step, a main component raw material and an additive component raw material to make a dielectric layer are provided. As the main component raw material, a powder of a $BaTiO_3$-based compound having a perovskite $ABO_3$ can be used. The $BaTiO_3$-based compound may be synthesized by a known method such as a solid phase reaction method, a hydrothermal synthesis method, or an alkoxide method, for example. It is preferable, for example, that the main component raw material have a particle size D50 of about 110 nm or more and about 150 nm or less, and the c-axis/a-axis ratio of the perovskite structure of about 1.0085 to about 1.0100. Here, the particle size D50 is an equivalent circle diameter. The equivalent circle diameter can be measured through the observation of grains using SEM and analysis of the obtained image. Such a main component raw material allows a multilayer ceramic capacitor to have excellent insulating properties and reliability characteristics.

Mixing Step

In the mixing step, an additive component raw material (for example, Ni, Re, Mg, Mn, Si, Al, V, etc.) is mixed with a main component raw material to form a dielectric raw material. As the additive component raw material, a known ceramic raw material such as, for example, an oxide, a carbonate, a hydroxide, a nitrate, an organic acid salt, an alkoxide and/or a chelate compound may be used. The mixing method is not particularly limited. For example, a weighed main component raw material and a weight additive component raw material are mixed and ground in a wet manner using a ball mill together with a grinding medium and pure water. When mixing is performed in a wet manner, the mixture may be dried.

Forming Step

In the forming step, a binder and a solvent are added to and mixed with a dielectric material to obtain a slurry. Then, a green sheet for a dielectric layer is formed from the obtained slurry. After firing, the green sheet for the dielectric layer becomes a dielectric layer included in the inner and outer layers of the multilayer ceramic capacitor. As the binder, a known organic binder such as, for example, a polyvinyl butyral binder may be used. As a solvent, a known organic solvent such as, for example, toluene or ethanol may be used. An additive such as, for example, a plasticizer may be added if necessary. A known method such as, for example, a RIP process may be used for the forming. The sheet thickness after the forming is, for example, about 1 μm or less.

Printing Step

In the printing step, an electrically-conductive paste for the internal electrode layers is used to form a patterned electrically-conductive paste layer on the surface of the green sheet for the dielectric layer. The conductive paste layer becomes an internal electrode layer after firing. As an electrically-conductive metal included in the conductive paste, a conductive material such, for example, as nickel (Ni), copper (Cu), silver (Ag), palladium (Pd), and an alloy including these may be used. However, nickel (Ni) is preferable. A ceramic component defining and functioning as an additive may be added to the conductive paste. As the ceramic component, a main component raw material of the dielectric layer can be used. The method of forming the conductive paste layer is not particularly limited. For example, techniques such as screen printing and gravure printing can be used.

Laminating Step

In the laminating step, a plurality of dielectric layer green sheets for the dielectric layers are laminated (stacked) and pressed to produce a laminated block. At this time, the plurality of green sheets for the dielectric layers with electrically-conductive paste layers are laminated so as to be sandwiched from above and below by green sheets for the dielectric layer without conductive paste layers. The green sheet without a conductive paste layer becomes the outer layer of the multilayer ceramic capacitor after the firing step. On the other hand, the green sheets with a conductive layer become dielectric layers included in the inner layer of the multilayer ceramic capacitor. The number of green sheets to be laminated may be adjusted so as to obtain a required capacitance.

Cutting Step

In the cutting step, the obtained laminated block is cut into laminated chips. Cutting may be performed such that a chip of a predetermined size is obtained, and at least a portion of the conductive paste layer is exposed to the end surface and the side surface of the laminated chip.

Side Margin Forming Step

In the side margin forming step, side margin green bodies are attached to the side surfaces of the laminated chip to make a green base body. The side margin green bodies cover the conductive paste layer exposed on the side surfaces of the laminated chip. After firing, the side margin green bodies become the side margin portions of the multilayer ceramic capacitor after firing. As a raw material of the side margin green body, the main component raw material and the additive component raw material used for manufacturing the dielectric layer can be used. However, it is not necessary to make the composition of the side margins the same as that of the dielectric layers, and may be different therefrom. For example, only a portion of the additive component of the dielectric layer may be used, or an additive component different from the dielectric layers may be added. Alternatively, the composition of the side margin portions may be the same or substantially the same as that of the dielectric layers.

The side margin green body may be produced and attached by a known method. For example, a method of producing a green sheet from a raw material powder of a side margin and attaching the green sheet to the side surface of the laminated chip may be used. In this case, an adhesive auxiliary agent, such as an organic solvent, for example, may be applied to the side surface of the laminated chip in advance in order to ensure adhesion of the green sheet. Alternatively, a paste may be prepared from a raw material powder of the side margin, and the paste may be applied to the side surface of the laminated chip and dried. The side margin green body may be a single layer, or may be a multilayer body including a plurality of layers. The side margin green body including a multilayer body may be obtained by, for example, laminating a plurality of green sheets on the side surface of the laminated chip or repeating application and drying of a paste.

Firing Step

In the firing step, the green base body is subjected to a debinding treatment and a firing treatment to produce a base body. The electrically-conductive paste layer and the green sheet for the dielectric layer are co-fired in the firing step to make the internal electrode layers and the dielectric layers, respectively. The conditions of the debinding treatment may be determined according to the type of the organic binder included in the green sheet and the conductive paste layer. The firing step may be performed at a temperature which densifies the laminated chip sufficiently. For example, the firing step may be performed at a temperature of about 1200° C. or higher and about 1300° C. or lower for about 0 minutes or longer and about 10 minutes or shorter. The firing is performed in an atmosphere which does not reduce the main component, i.e., $BaTiO_3$-based compound, while at the same time restricts the oxidization of the electrically-conductive materials. For example, the firing may be performed in a $N_2$—$H_2$—$H_2O$ flow having an oxygen partial pressure of about $1.8\times10^{-9}$ MPa to about $8.7\times10^{-10}$ MPa. Furthermore, annealing treatment may be performed after the firing.

External Electrode Forming Step

In the external electrode forming step, external electrodes are formed in the base body to manufacture a multilayer ceramic capacitor. The external electrodes may be formed by a known method. For example, an electrically-conductive paste mainly including a conductive component such as, for example, Cu or Ni is applied on the end surface, at which the internal electrodes of the base body are drawn and exposed, and fired, thus forming a base layer. The base layer may be formed by, for example, applying the electrically-conductive paste to both end surfaces of the green base body before firing, followed by the firing treatment. After forming the base layer, electrolytic plating may be performed to form a plated film such as, for example, Ni or Sn on the surface of the base layer. Thus, the multilayer ceramic capacitor is manufactured.

EXAMPLES

Examples 1 to 67

In Examples 1 to 67, the compositions of the dielectric layers were varied to manufacture multilayer ceramic capacitors, which were evaluated thereafter. The compositions of the dielectric layers and the characteristics of the capacitor are summarized in Table 1.

A $Ba_mTiO_3$ powder was prepared as a main component raw material. Here, m refers to the A/B molar ratio, i.e., Ba/Ti molar ratio, of the perovskite compound ($ABO_3$). The $Ba_mTiO_3$ powder used had a particle size D50 of about 140 nm and a c-axis/a-axis ratio of the perovskite structure of about 1.0090. Next, the prepared $Ba_mTiO_3$ powder was weighed and wet-mixed by a ball mill to break up aggregates.

Besides the main component raw material, the additive component raw materials (Ni, Re, Mg, Mn, Si, Al, V) were weighed. As the additive component raw materials, nickel oxide (NiO), rare earth oxides ($Dy_2O_3$, etc.), magnesium carbonate ($MgCO_3$), manganese carbonate ($MnCO_3$), silicon oxide ($SiO_2$), aluminum oxide ($Al_2O_3$), and vanadium oxide ($V_2O_5$) were used. The amounts of the main component raw material and the additive component raw materials were adjusted to provide a composition of the dielectric layers in the manufactured multilayer ceramic capacitor, as shown in Tables 1 and 2.

Next, the additive component raw material was added to the main component raw material, and dried and heat-treated after wet mixing using a ball mill to obtain a dielectric raw material. A polyvinyl butyral binder and ethanol that defines and functions as an organic solvent were added to the resulting dielectric raw material, followed by wet-mixed by a ball mill for a predetermined time to prepare a slurry. The slurry was shaped to form a sheet, thus producing a green sheet for a dielectric layer.

Then, an electrically-conductive paste that mainly includes Ni was screen-printed on a surface of the resulting green sheet for a dielectric layer, and a conductive paste layer that defines and functions as an internal electrode layer was patterned. Thereafter, a plurality of green sheets with the conductive paste layers were laminated, green sheets without conductive paste layers were provided from above and below, and the resulting entire article was pressed, to manufacture a laminated block. The obtained laminated block was cut into laminated chips by a dicing saw. The lamination was performed such that the extracted ends of the conductive paste layers were alternately provided. Cutting was performed such that the conductive paste layers were exposed at the side surfaces.

Side margin green sheets (side margin green bodies) were attached to both side surfaces of the laminated chips, at which the conductive paste layers were exposed, to produce a green base body. The side margin green sheets were produced in the same or substantially the same manner as the green sheets for the dielectric layers, except that the amounts of the main component raw material and the additive component raw materials were changed. At this time, the blending amounts were adjusted to provide a composition including $BaTiO_3$ compound with an A/B ratio of about 1.005, about 1.5 parts by mol of Ni, about 1.0 parts by mol of Re(Dy), about 0.03 parts by mol of Mg, about 0.10 parts by mol of Mn, about 0.8 parts by mol of Si, about 0.08 parts by mol of Al, and about 0.08 parts by mol of V with respect to 100 mol of Ti in the side margin portions of the manufactured multilayer ceramic capacitor.

The resulting green base body was heat-treated in $N_2$ flow at a maximum temperature of about 270° C., and further heat-treated in $N_2$—$H_2O$—$H_2$ flow at a maximum temperature of about 800° C. Thereafter, the resulting green base body was fired in $N_2$—$H_2O$—$H_2$ flow with an oxygen partial pressure of about $1.8\times10^{-9}$ MPa to about $8.7\times10^{-10}$ MPa, at the heating rate of about 20° C./sec, and at a maximum temperature of about 1260° C. In the firing stage, the fired green base body was cooled to near room temperature immediately after reaching the maximum temperature of about 1260° C. Subsequently, the heat treatment was applied for about 35 minutes in $N_2$—$H_2O$—$H_2$ flow at a maximum temperature of about 1090° C. Thus, a base body of the multilayer ceramic capacitor was obtained.

An electrically-conductive paste mainly including copper (Cu) was applied to the end surfaces of the base body obtained by firing, on which the internal electrode layers are extracted. Thereafter, the applied conductive paste was fired at about 900° C. to form a base layer of the external electrode. The surface layer of the base layer was subjected to Ni plating and Sn plating in this order by wet plating. In this way, multilayer ceramic capacitors of Examples 1 to 67 were manufactured.

The manufactured multilayer ceramic capacitors had a size of about 0.4 mm in the length direction L, about 0.2 mm in the width direction W, and about 0.2 mm in the thickness direction T. The thickness of each of the dielectric layers in the inner layer portion was about 0.5 μm while the thickness of each of the internal electrode layers was about 0.4 μm. The number of the dielectric layer was a hundred and fifty.

Examples 68 to 81

The amounts of the raw materials were adjusted to provide compositions of the dielectric layers and the side margin portions in the manufactured multilayer ceramic capacitors, as shown in Table 3. Except for the above, multilayer ceramic capacitors were manufactured in the same or substantially the same manner as in Example 6.

Example 82

In the manufactured multilayer ceramic capacitor, the amounts of the raw materials were adjusted to provide compositions of the dielectric layers and the side margin portions, as shown in Table 3. Except for the above, a multilayer ceramic capacitor was manufactured in the same or substantially the same manner as in Example 1.

(2) Evaluation

The manufactured multilayer ceramic capacitors were evaluated for various characteristics as follows.

Composition Analysis

On the cross section of the multilayer ceramic capacitors, the side margin portion was analyzed by laser ablation ICP-MS. Furthermore, portions other than the inner region (22) were removed by ablating, and after being pulverized, the internal electrode Ni was removed by a magnet. The remaining ceramics were analyzed by ICP-MS to analyze the compositions of the dielectric layers.

Ni and Re Distributions in Grains

The cross sections of the multilayer ceramic capacitors were subjected to mapping analysis using TEM-EDX to evaluate the distributions of nickel (Ni) and rare earth elements (Re) within the crystal grains. More specifically, the central portion of the multilayer ceramic capacitor was ablated to obtain a cross section LT, thus exposing the dielectric layers. TEM observation was performed on the main crystal grains in the vicinity of the central portion of the exposed dielectric layers, to obtain a mapping image showing an atomic distribution in the grains using EDX. The observations were made on 100 grains. Then, the obtained mapping image was subjected to image analysis in order to quantify the Ni concentration and the Re concentration. Using the obtained data, the number ratio of Ni-containing grains and the area ratio of the high-Ni-concentration region in the main crystal grains were determined.

Capacitance

The capacitance of multilayer ceramics was measured using an automatic bridge measuring apparatus. The measurement was performed under the following conditions: temperature about 25° C., effective voltage about 0.5 Vrms, and frequency of about 1 kHz. The resulting capacitance was divided by the volume of the dielectric layers of the inner layer portion to determine the capacitance per unit volume (volume capacity).

Insulation Resistance

Twenty samples were charged at room temperature by applying a DC voltage of about 4 V between the external electrodes of the samples, and holding for about 60 seconds. The insulating resistances of the samples after being charged were measured, and the average of the logarithmic values was obtained as a Log IR.

Short Circuit Rate

The insulation resistances of 100 samples were measured, and the number of samples having insulation resistance of about 100Ω or less was counted. The number of the samples that have an insulation resistance of about 100Ω or less was divided by the total number of the samples to calculate the short circuit rate.

High Temperature Load Test

Per 100 samples, a high temperature load test was performed under the conditions of temperature of about 150° C. and applied voltage of about 3.2 V, and the insulation resistance IR (Ω) after about 50 hours or about 200 hours elapsed was measured. Samples having Log IR≤4 were determined to be defective (NG), and the NG rate was calculated from the number of the defective samples.

Moisture Resistance Load Test

Per 100 samples, a humidity resistance load test was performed under the conditions of temperature of about 125° C., humidity of about 95% RH, and the applied voltage of about 2 V or about 4 V, and the insulation resistance IR after about 72 hours elapsed was measured. Samples having Log IR≤4 were determined to be defective (NG), and the NG rate was calculated from the number of the defective samples.

(3) Results

Examples 1 to 29

For the multilayer ceramic capacitors obtained in Example 1 to Example 29, the compositions and capacitor characteristics of the dielectric layers are shown in Table 1. Examples 1 to 29 are samples having various contents of Ni, Re, and Mg, and various kinds of Re in the dielectric layers in the inner and outer layers. Examples 1, 2, 10, 11, 17, and 19 to 21 are comparative examples that do not satisfy the requirements of the present preferred embodiment, and the examples other than these comparative examples are Examples of the present preferred embodiment.

In the samples of the comparative examples (Examples 1, 2, 10, 11, 17, and 19 to 21) in which the contents of Ni, Re, and Mg do not satisfy the ranges specified in the present preferred embodiment, some or all of the insulating properties (Log IR and short-circuit rate) and the reliability (high temperature load characteristics and moisture resistance load characteristics) were inferior. In contrast, the samples of Examples (Examples 3 to 9, 12 to 16, 18, and 22 to 29) were excellent in the insulating properties and the reliability. Therefore, it was discovered that limiting Ni content, Re content, and Mg content within the range specified in the present preferred embodiment enables a multilayer ceramic capacitor to have excellent insulating properties and reliability.

In addition, samples in which the number ratio of Ni-containing particles including a high-Ni-concentration region at a ratio of about 9% or more was about 4% or more had excellent insulating properties and reliability. In particular, samples in which the number ratio was about 7% or more had particularly excellent reliability. It should be noted that, in the Ni-containing grains, the content of the rare earth element (Re) to 100 parts by mol of titanium (Ti) in the high-Ni-concentration region was about 1.3 times or more than the content of the rare earth element (Re) to 100 parts by mol of titanium (Ti) in the low-Ni-concentration region.

TABLE 1

Composition and Characteristics of Multilayer Ceramic Capacitor

| | Ba | Ti | Zr | A/B | Ni | Re | | Mg | Mn | Si | Al | V | Number Ratio of Ni-containing Particles | LogIR | Short Circuit Rate | High Temperature Load Test NG Rate (50 hr) | High Temperature Load Test NG Rate (200 hr) | Moisture Resistance Rate Load Test NG (2 V) |
|---|---|---|---|---|---|---|---|---|---|---|---|---|---|---|---|---|---|---|
| Example1* | 101.0 | 100.0 | 0.5 | 1.005 | 0.0 | Dy | 1.0 | 0.03 | 0.1 | 0.8 | 0.08 | 0.08 | 1 | 4.9 | 50% | 62% | 83% | 75% |
| Example2* | 101.0 | 100.0 | 0.5 | 1.005 | 0.1 | Dy | 1.0 | 0.03 | 0.1 | 0.8 | 0.08 | 0.08 | 3 | 8.0 | 0% | 22% | 45% | 30% |
| Example3 | 101.0 | 100.0 | 0.5 | 1.005 | 0.2 | Dy | 1.0 | 0.03 | 0.1 | 0.8 | 0.08 | 0.08 | 4 | 9.1 | 0% | 0% | 8% | 0% |
| Example4 | 101.0 | 100.0 | 0.5 | 1.005 | 0.5 | Dy | 1.0 | 0.03 | 0.1 | 0.8 | 0.08 | 0.08 | 10 | 9.2 | 0% | 0% | 0% | 0% |
| Example5 | 101.0 | 100.0 | 0.5 | 1.005 | 1.0 | Dy | 1.0 | 0.03 | 0.1 | 0.8 | 0.08 | 0.08 | 16 | 9.2 | 0% | 0% | 0% | 0% |
| Example6 | 101.0 | 100.0 | 0.5 | 1.005 | 1.5 | Dy | 1.0 | 0.03 | 0.1 | 0.8 | 0.08 | 0.08 | 18 | 9.4 | 0% | 0% | 0% | 0% |
| Example7 | 101.0 | 100.0 | 0.5 | 1.005 | 2.0 | Dy | 1.0 | 0.03 | 0.1 | 0.8 | 0.08 | 0.08 | 17 | 9.2 | 0% | 0% | 0% | 0% |
| Example8 | 101.0 | 100.0 | 0.5 | 1.005 | 2.5 | Dy | 1.0 | 0.03 | 0.1 | 0.8 | 0.08 | 0.08 | 13 | 9.1 | 0% | 0% | 0% | 0% |
| Example9 | 101.0 | 100.0 | 0.5 | 1.005 | 3.0 | Dy | 1.0 | 0.03 | 0.1 | 0.8 | 0.08 | 0.08 | 77 | 9.1 | 0% | 0% | 0% | 0% |
| Example10* | 101.0 | 100.0 | 0.5 | 1.005 | 3.1 | Dy | 1.0 | 0.03 | 0.1 | 0.8 | 0.08 | 0.08 | 3 | 7.2 | 10% | 25% | 48% | 36% |
| Example11* | 101.0 | 100.0 | 0.5 | 1.005 | 1.5 | Dy | 0.4 | 0.03 | 0.1 | 0.0 | 0.08 | 0.08 | 3 | 9.1 | 0% | 11% | 30% | 19% |
| Example12 | 101.0 | 100.0 | 0.5 | 1.005 | 1.5 | Dy | 0.6 | 0.03 | 0.1 | 0.8 | 0.08 | 0.08 | 4 | 9.1 | 0% | 0% | 15% | 0% |
| Example13 | 101.0 | 100.0 | 0.5 | 1.005 | 1.5 | Dy | 0.8 | 0.03 | 0.1 | 0.8 | 0.08 | 0.08 | 15 | 9.3 | 0% | 0% | 0% | 0% |
| Example14 | 101.0 | 100.0 | 0.5 | 1.005 | 1.5 | Dy | 1.0 | 0.03 | 0.1 | 0.8 | 0.08 | 0.08 | 18 | 9.4 | 0% | 0% | 0% | 0% |
| Example15 | 101.0 | 100.0 | 0.5 | 1.005 | 1.5 | Dy | 1.5 | 0.03 | 0.1 | 0.8 | 0.08 | 0.08 | 17 | 9.3 | 0% | 0% | 0% | 0% |
| Example16 | 101.0 | 100.0 | 0.5 | 1.005 | 1.5 | Dy | 2.0 | 0.03 | 0.1 | 0.8 | 0.08 | 0.08 | 11 | 9.3 | 0% | 0% | 0% | 0% |
| Example17* | 101.0 | 100.0 | 0.5 | 1.005 | 1.5 | Dy | 2.2 | 0.05 | 0.1 | 0.8 | 0.08 | 0.08 | 4 | 9.0 | 20% | 9% | 28% | 20% |
| Example18 | 101.0 | 100.0 | 0.5 | 1.005 | 1.5 | Dy | 1.0 | 0.10 | 0.1 | 0.8 | 0.08 | 0.08 | 4 | 9.2 | 0% | 0% | 12% | 0% |
| Example19* | 101.0 | 100.0 | 0.5 | 1.005 | 1.5 | Dy | 1.0 | 0.50 | 0.1 | 0.8 | 0.08 | 0.08 | 4 | 8.8 | 5% | 10% | 33% | 20% |
| Example20* | 101.0 | 100.0 | 0.5 | 1.005 | 1.5 | Dy | 1.0 | 1.00 | 0.1 | 0.8 | 0.08 | 0.08 | 0 | 7.0 | 47% | 80% | 100% | 73% |
| Example21* | 101.0 | 100.0 | 0.5 | 1.005 | 1.5 | Dy | 1.0 | 0.03 | 0.1 | 0.8 | 0.08 | 0.08 | 0 | 4.0 | 100% | 100% | 100% | 100% |
| Example22 | 101.0 | 100.0 | 0.5 | 1.005 | 1.5 | Y | 1.0 | 0.03 | 0.1 | 0.8 | 0.08 | 0.05 | 3 | 9.2 | 0% | 0% | 12% | 0% |
| Example23 | 101.0 | 100.0 | 0.5 | 1.005 | 1.5 | Pr, Lu (0.5, 0.5) | 1.0 | 0.03 | 0.1 | 0.8 | 0.08 | 0.05 | 4 | 9.0 | 0% | 0% | 11% | 0% |
| Example24 | 101.0 | 100.0 | 0.5 | 1.005 | 1.5 | Nd, Yb (0.5, 0.5) | 1.0 | 0.03 | 0.1 | 0.8 | 0.08 | 0.05 | 4 | 9.1 | 0% | | 12% | 0% |
| Example25 | 101.0 | 100.0 | 0.5 | 1.005 | 1.5 | Sm, Tm (0.5, 0.5) | 1.0 | 0.03 | 0.1 | 0.8 | 0.08 | 0.05 | 4 | 9.0 | 0% | 0% | 10% | 0% |
| Example26 | 101.0 | 100.0 | 0.5 | 1.005 | 1.5 | Eu, Er (0.5, 0.5) | 1.0 | 0.03 | 0.1 | 0.8 | 0.08 | 0.05 | 4 | 9.1 | 0% | 0% | 0% | 0% |
| Example27 | 101.0 | 100.0 | 0.5 | 1.005 | 1.5 | Gd | 1.0 | 0.03 | 0.1 | 0.8 | 0.08 | 0.05 | 15 | 9.3 | 0% | 0% | 0% | 0% |
| Example28 | 101.0 | 100.0 | 0.5 | 1.005 | 1.5 | Tb | 1.0 | 0.03 | 0.1 | 0.8 | 0.08 | 0.05 | 17 | 9.3 | 0% | 0% | 0% | 0% |
| Example29 | 101.0 | 100.0 | 0.5 | 1.005 | 1.5 | Ho | 1.0 | 0.03 | 0.1 | 0.8 | 0.08 | 0.05 | 16 | 9.4 | 0% | 0% | 0% | 0% |

Note 1:
*indicates Comparative Example

Note 2:
"Ni-containing particles" refers to particles including a high-Ni-concentration region in an area cacio in cross section of 9% or more.

Figure 6:
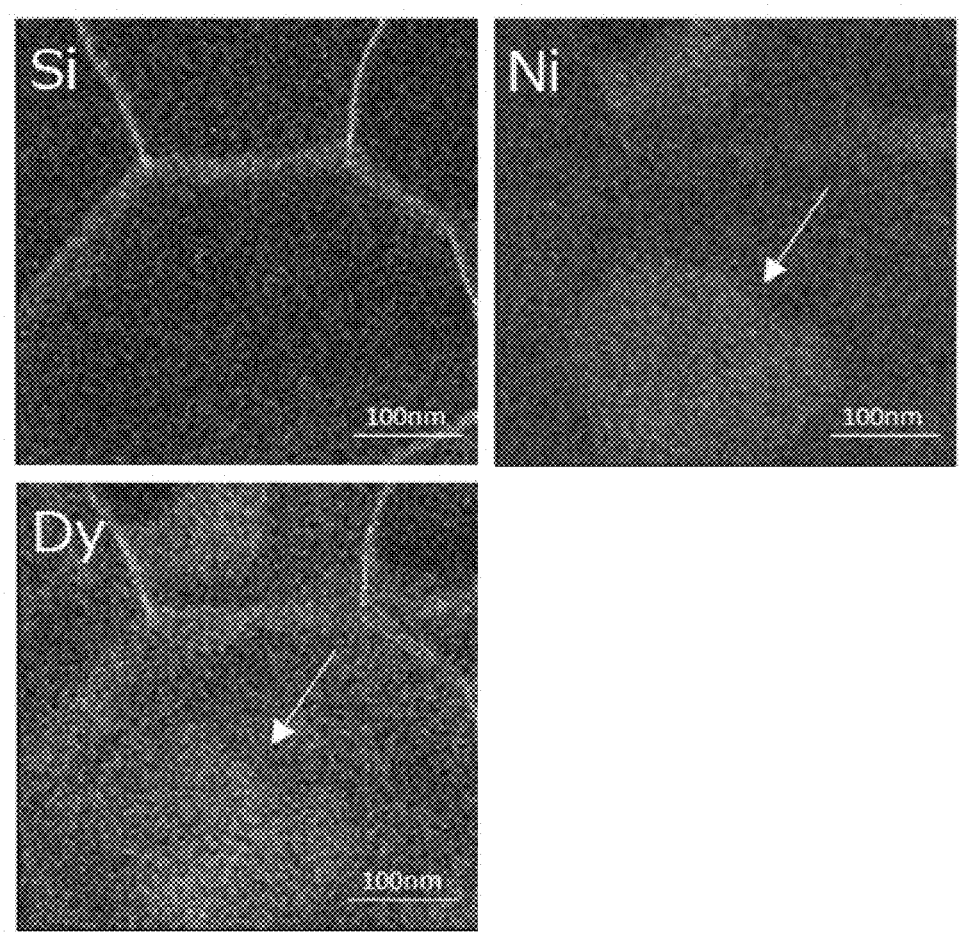
FIG. 6 is a diagram showing element mapping images on a cross section of a dielectric layer of a multilayer ceramic capacitor according to a preferred embodiment of the present invention.

The element mapping images on a cross section of the dielectric layer in the inner layer of the multilayer ceramic capacitor obtained in Example 6 are shown in FIG. 6. As shown in FIG. 6, silicon (Si) was segregated at the grain boundaries. Nickel (Ni) and dysprosium (Dy) formed a solid solution in the main crystal grain. A high concentration region (a high-Ni-concentration region and a high-Dy-concentration region) was formed in the central portion of the grain.

Examples 30 to 67

For the multilayer ceramic capacitors obtained in Example 30 to Example 67, the compositions and capacitor characteristics of the dielectric layers are shown in Table 2. Examples 30 to 67 are samples having various contents of Mn, Si, Al, and V, and Ba/Ti molar ratio (A/B molar ratio) in the dielectric layers in the inner and outer layers. Here Examples 32, 39, 46, 54, and 61 are the same samples as Example 6.

All of Examples 30 to 67 were excellent in insulating properties (Log IR and short-circuit ratio) and reliability (high temperature loading characteristics and humidity resistance loading characteristics). In particular, Examples 31 to 35, 38 to 42, 45 to 50, 53 to 57, 60 to 64, 66, and 67, in which Mn content, Si content, Al content, V content, and molar ratio of Ba/Ti were within the predetermined range, had further excellent high temperature loading properties for a long time (for example, about 200 hours). From this, it was found that by limiting Mn content, Si content, Al content, V content, and Ba/Ti molar ratio within the predetermined range further improves reliability (high temperature loading properties).

TABLE 2

Composition and Characteristics of Multilayer Ceramic Capacitor

| | Ba | Ti | Zr | A/B | Ni | Re | Mg | Mn | Si | Al | V | Number Ratio of Ni-containing Particles | LogIR | Short Circuit Rate | High Temperature Load Test NG Rate (50 hr) | High Temperature Load Test NG Rate (200 hr) | Moisture Resistance Rate Load Test NG (2 V) |
|---|---|---|---|---|---|---|---|---|---|---|---|---|---|---|---|---|---|
| Example30 | 101.0 | 100.0 | 0.5 | 1.005 | 1.5 | Dy 1.0 | 0.03 | 0.05 | 0.8 | 0.08 | 0.08 | 4 | 9.2 | 0% | 0% | 15% | 0% |
| Example31 | 101.0 | 100.0 | 0.5 | 1.005 | 1.5 | Dy 1.0 | 0.03 | 0.08 | 0.8 | 0.08 | 0.08 | 10 | 9.3 | 0% | 0% | 0% | 0% |
| Example32 | 101.0 | 100.0 | 0.5 | 1.005 | 1.5 | Dy 1.0 | 0.03 | 0.10 | 0.8 | 0.08 | 0.08 | 18 | 9.4 | 0% | 0% | 0% | 0% |
| Example33 | 101.0 | 100.0 | 0.5 | 1.005 | 1.5 | Dy 1.0 | 0.03 | 0.20 | 0.8 | 0.08 | 0.08 | 17 | 9.3 | 0% | 0% | 0% | 0% |
| Example34 | 101.0 | 100.0 | 0.5 | 1.005 | 1.5 | Dy 1.0 | 0.00 | 0.30 | 0.8 | 0.08 | 0.08 | 16 | 9.4 | 0% | 0% | 0% | 0% |
| Example35 | 101.0 | 100.0 | 0.5 | 1.005 | 1.5 | Dy 1.0 | 0.03 | 0.40 | 0.8 | 0.08 | 0.08 | 10 | 9.2 | 0% | 0% | 0% | 0% |
| Example36 | 101.0 | 100.0 | 0.5 | 1.005 | 1.5 | Dy 1.0 | 0.03 | 0.45 | 0.8 | 0.08 | 0.08 | 3 | 9.2 | 0% | 0% | 18% | 0% |
| Example37 | 101.0 | 100.0 | 0.5 | 1.005 | 1.5 | Dy 1.0 | 0.03 | 0.10 | 0.4 | 0.08 | 0.08 | 4 | 9.1 | 0% | 0% | 13% | 0% |
| Example38 | 101.0 | 100.0 | 0.5 | 1.005 | 1.5 | Dy 1.0 | 0.03 | 0.10 | 0.6 | 0.08 | 0.08 | 10 | 9.2 | 0% | 0% | 0% | 0% |
| Example39 | 101.0 | 100.0 | 0.5 | 1.005 | 1.5 | Dy 1.0 | 0.03 | 0.10 | 0.8 | 0.08 | 0.08 | 18 | 9.4 | 0% | 0% | 0% | 0% |
| Example40 | 101.0 | 100.0 | 0.5 | 1.005 | 1.5 | Dy 1.0 | 0.03 | 0.10 | 1.0 | 0.08 | 0.08 | 18 | 9.4 | 0% | 0% | 0% | 0% |
| Example41 | 101.0 | 100.0 | 0.5 | 1.005 | 1.5 | Dy 1.0 | 0.03 | 0.10 | 1.5 | 0.08 | 0.08 | 10 | 9.3 | 0% | 0% | 0% | 0% |
| Example42 | 101.0 | 100.0 | 0.5 | 1.005 | 1.5 | Dy 1.0 | 0.03 | 0.10 | 2.0 | 0.08 | 0.08 | 8 | 9.2 | 0% | 0% | 0% | 0% |
| Example43 | 101.0 | 100.0 | 0.5 | 1.005 | 1.5 | Dy 1.0 | 0.03 | 0.10 | 2.3 | 0.08 | 0.08 | 3 | 9.1 | 0% | 0% | 20% | 0% |
| Example44 | 101.0 | 100.0 | 0.5 | 1.005 | 1.5 | Dy 1.0 | 0.03 | 0.10 | 0.8 | 0.00 | 0.08 | 4 | 9.1 | 0% | 0% | 12% | 0% |
| Example45 | 101.0 | 100.0 | 0.5 | 1.005 | 1.5 | Dy 1.0 | 0.03 | 0.10 | 0.8 | 0.04 | 0.08 | 9 | 9.2 | 0% | 0% | 0% | 0% |
| Example46 | 101.0 | 100.0 | 0.5 | 1.005 | 1.5 | Dy 1.0 | 0.03 | 0.10 | 0.8 | 0.08 | 0.08 | 18 | 9.4 | 0% | 0% | 0% | 0% |
| Example47 | 101.0 | 100.0 | 0.5 | 1.005 | 1.5 | Dy 1.0 | 0.03 | 0.10 | 0.8 | 0.15 | 0.08 | 17 | 9.3 | 0% | 0% | 0% | 0% |
| Example48 | 101.0 | 100.0 | 0.5 | 1.005 | 1.5 | Dy 1.0 | 0.03 | 0.10 | 0.8 | 0.20 | 0.08 | 18 | 9.3 | 0% | 0% | 0% | 0% |
| Example49 | 101.0 | 100.0 | 0.5 | 1.005 | 1.5 | Dy 1.0 | 0.03 | 0.10 | 0.8 | 0.25 | 0.08 | 14 | 9.2 | 0% | 0% | 0% | 0% |
| Example50 | 101.0 | 100.0 | 0.5 | 1.005 | 1.5 | Dy 1.0 | 0.03 | 0.10 | 0.8 | 0.30 | 0.08 | 8 | 9.1 | 0% | 0% | 0% | 0% |
| Example51 | 101.0 | 100.0 | 0.5 | 1.005 | 1.5 | Dy 1.0 | 0.03 | 0.10 | 0.8 | 0.35 | 0.08 | 3 | 9.0 | 0% | 0% | 14% | 0% |
| Example52 | 101.0 | 100.0 | 0.5 | 1.005 | 1.5 | Dy 1.0 (0.5, 0.5) | 0.03 | 0.10 | 0.8 | 0.08 | 0.00 | 4 | 9.4 | 0% | 0% | 11% | 0% |
| Example53 | 101.0 | 100.0 | 0.5 | 1.005 | 1.5 | Dy 1.0 | 0.03 | 0.10 | 0.8 | 0.08 | 0.04 | 11 | 9.3 | 0% | 0% | 0% | 0% |
| Example54 | 101.0 | 100.0 | 0.5 | 1.005 | 1.5 | Dy 1.0 | 0.03 | 0.10 | 0.8 | 0.08 | 0.08 | 18 | 9.4 | 0% | 0% | 0% | 0% |
| Example55 | 101.0 | 100.0 | 0.5 | 1.005 | 1.5 | Dy 1.0 | 0.03 | 0.10 | 0.8 | 0.08 | 0.12 | 18 | 9.0 | 0% | 0% | 0% | 0% |
| Example56 | 101.0 | 100.0 | 0.5 | 1.005 | 1.5 | Dy 1.0 | 0.03 | 0.10 | 0.8 | 0.08 | 0.16 | 17 | 8.7 | 0% | 0% | 0% | 0% |
| Example57 | 101.0 | 100.0 | 0.5 | 1.005 | 1.5 | Dy 1.0 | 0.03 | 0.10 | 0.8 | 0.08 | 0.20 | 9 | 8.6 | 0% | 0% | 0% | 0% |
| Example58 | 101.0 | 100.0 | 0.5 | 1.005 | 1.5 | Dy 1.0 | 0.03 | 0.10 | 0.8 | 0.08 | 0.24 | 3 | 8.5 | 0% | 0% | 19% | 0% |
| Example59 | 102.0 | 100.0 | 0.5 | 1.015 | 1.5 | Dy 1.0 | 0.03 | 0.10 | 0.8 | 0.08 | 0.08 | 4 | 9.0 | 0% | 0% | 16% | 0% |
| Example60 | 101.5 | 100.0 | 0.5 | 1.010 | 1.5 | Dy 1.0 | 0.03 | 0.10 | 0.8 | 0.08 | 0.08 | 10 | 9.1 | 0% | 0% | 0% | 0% |
| Example61 | 101.0 | 100.0 | 0.5 | 1.005 | 1.5 | Dy 1.0 | 0.03 | 0.10 | 0.8 | 0.08 | 0.08 | 18 | 9.4 | 0% | 0% | 0% | 0% |
| Example62 | 100.5 | 100.0 | 0.5 | 1.000 | 1.5 | Dy 1.0 | 0.03 | 0.10 | 0.8 | 0.08 | 0.08 | 16 | 9.3 | 0% | 0% | 0% | 0% |
| Example63 | 100.0 | 100.0 | 0.5 | 0.995 | 1.5 | Dy 1.0 | 0.03 | 0.10 | 0.8 | 0.08 | 0.08 | 14 | 9.3 | 0% | 0% | 0% | 0% |
| Example64 | 99.5 | 100.0 | 0.5 | 0.990 | 1.5 | Dy 1.0 | 0.03 | 0.10 | 0.8 | 0.08 | 0.08 | 9 | 9.3 | 0% | 0% | 0% | 0% |
| Example65 | 99.0 | 100.0 | 0.5 | 0.985 | 1.5 | Dy 1.0 | 0.03 | 0.10 | 0.8 | 0.08 | 0.08 | 4 | 9.0 | 0% | 0% | 11% | 0% |
| Example66 | 101.1 | 100.0 | 0.1 | 1.010 | 1.5 | Dy 1.0 | 0.03 | 0.10 | 0.8 | 0.08 | 0.08 | 10 | 9.3 | 0% | 0% | 0% | 0% |
| Example67 | 100.8 | 100.0 | 1.8 | 0.990 | 1.5 | Dy 1.0 | 0.03 | 0.10 | 0.8 | 0.08 | 0.08 | 9 | 9.2 | 0% | 0% | 0% | 0% |

Note 1:
"*" indicates Comparative Example

Note 2:
"Ni-containing particles" refers to particles including a high-Ni-concentration region in an area ratio in cross section of 9% or more.

Examples 68 to 82

For the multilayer ceramic capacitors obtained in Examples 68 to 82, the compositions and the capacitor characteristics of the dielectric layers and the side margin portion are shown in Table 3. Example 82 is a comparative example in which the compositions of the dielectric layers in the inner layer and the outer layer do not satisfy the requirements of the present preferred embodiment. The examples other than these comparative examples are Examples for preferred embodiments of the present preferred embodiment.

The multilayer ceramic capacitors of Examples 68 to 82 were graded according to the following criteria based on their characteristics:

"A" indicates satisfying all of the volume capacity being about 80 μF/mm³ or more, the high temperature load test NG rate (about 50 hours) being about 5% or less, the moisture resistance load test NG rate (about 2 V) being about 5% or less, and the moisture resistance load test NG rate (4V) being about 5% or less.

"B" indicates satisfying three items among the volume capacity being about 80 μF/mm³ or more, the high temperature load test NG rate (about 50 hours) being about 5% or less, the moisture resistance load test NG rate (2 V) being about 5% or less, and the moisture resistance load test NG rate (4V) being about 5% or less.

"C" indicates not satisfying the requirements of A or B.

In the sample of the comparative example (Example 82), the insulating properties (Log IR and short-circuit rate) and reliability (high-temperature load characteristics, moisture resistance load characteristics) were inferior. On the other hand, the samples of the Examples (Examples 68 to 81) were excellent in the insulating properties and the reliability. In particular, Examples 69 to 74, 76 to 79, and 81, which had Mg content and Mn content of the side margin portion within the predetermined ranges, were further excellent in the humidity load resistance characteristics under applied high voltage (4 V) while maintaining a high volume capacity. From this, it was discovered that the reliability (moisture resistance load characteristics) was further improved by limiting the composition of the side margin portion to a predetermined range.

TABLE 3

Composition and Characteristics of Multilayer Ceramic Capacitor

| | Inner Layer/ Outer Layer | Side Margin Portion | | | | | | | | | | | | Volume Capacity (μF/mm³) | High Temperature Load Test NG Rate (50 hr) | Moisture Resistance Load Test NG Rate (2 V) | Moisture Resistance Load Test NG Rate (4 V) | Evaluation |
|---|---|---|---|---|---|---|---|---|---|---|---|---|---|---|---|---|---|---|
| | Layer | Ba | Ti | Zr | A/B | Ni | R | R | Mg | Mn | Si | Al | V | | | | | |
| Example68 | Same as Example 6 | 101.0 | 100.0 | 0.5 | 1.005 | 1.5 | Dy | 1.0 | 0.03 | 0.10 | 0.8 | 0.08 | 0.08 | 92 | 0% | 0% | 12% | A |
| Example69 | Same as Example 6 | 101.0 | 100.0 | 0.5 | 1.005 | 0.0 | Dy | 1.0 | 1.00 | 0.10 | 2.0 | 0.25 | 0.10 | 92 | 0% | 0% | 0% | A |
| Example70 | Same as Example 6 | 101.0 | 100.0 | 0.5 | 1.005 | 1.5 | Dy | 1.0 | 1.00 | 0.10 | 0.8 | 0.08 | 0.08 | 92 | 0% | 0% | 0% | A |
| Example71 | Same as Example 6 | 101.0 | 100.0 | 0.5 | 1.005 | 1.5 | Dy | 1.0 | 1.50 | 0.10 | 0.8 | 0.08 | 0.08 | 90 | 0% | 0% | 0% | A |
| Example72 | Same as Example 6 | 101.0 | 100.0 | 0.5 | 1.005 | 1.5 | Dy | 1.0 | 2.00 | 0.10 | 0.8 | 0.08 | 0.08 | 86 | 0% | 0% | 0% | A |
| Example73 | Same as Example 6 | 101.0 | 100.0 | 0.5 | 1.005 | 1.5 | Dy | 1.0 | 2.50 | 0.10 | 0.8 | 0.08 | 0.08 | 83 | 0% | 0% | 0% | A |
| Example74 | Same as Example 6 | 101.0 | 100.0 | 0.5 | 1.005 | 1.5 | Dy | 1.0 | 3.00 | 0.10 | 0.8 | 0.08 | 0.08 | 81 | 0% | 0% | 0% | A |
| Example75 | Same as Example 6 | 101.0 | 100.0 | 0.5 | 1.005 | 1.5 | Dy | 1.0 | 3.50 | 0.10 | 0.8 | 0.08 | 0.08 | 77 | 0% | 0% | 0% | B |
| Example76 | Same as Example 6 | 101.0 | 100.0 | 0.5 | 1.005 | 1.5 | Dy | 1.0 | 0.03 | 0.50 | 0.8 | 0.08 | 0.08 | 91 | 0% | 0% | 0% | A |
| Example77 | Same as Example 6 | 101.0 | 100.0 | 0.5 | 1.005 | 1.5 | Dy | 1.0 | 0.03 | 1.00 | 0.8 | 0.08 | 0.08 | 90 | 0% | 0% | 0% | A |
| Example78 | Same as Example 6 | 101.0 | 100.0 | 0.5 | 1.005 | 1.5 | Dy | 1.0 | 0.03 | 1.50 | 0.8 | 0.08 | 0.08 | 85 | 0% | 0% | 0% | A |
| Example79 | Same as Example 6 | 101.0 | 100.0 | 0.5 | 1.005 | 1.5 | Dy | 1.0 | 0.03 | 2.00 | 0.8 | 0.08 | 0.08 | 82 | 0% | 0% | 0% | A |
| Example80 | Same as Example 6 | 101.0 | 100.0 | 0.5 | 1.005 | 1.5 | Dy | 1.0 | 0.03 | 2.50 | 0.8 | 0.08 | 0.08 | 78 | 0% | 0% | 0% | B |
| Example81 | Same as Example 6 | 101.0 | 100.0 | 0.5 | 1.005 | 1.5 | Dy | 1.0 | 3.00 | 2.00 | 0.8 | 0.08 | 0.08 | 80 | 0% | 0% | 0% | A |
| Example82* | Same as Example 1 | 101.0 | 100.0 | 0.5 | 1.005 | 1.5 | Dy | 1.0 | 2.00 | 0.10 | 0.8 | 0.08 | 0.08 | 86 | 60% | 27% | 45% | C |

Note 1:
*indicates Comparative Example

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a base body including a first main surface and a second main surface opposed to each other in a thickness direction, a first side surface and a second side surface opposed to each other in a width direction, a first end surface and a second end surface opposed to each other in a length direction, and a plurality of dielectric layers and a plurality of internal electrode layers laminated in the thickness direction; and
a pair of external electrodes respectively at the first end surface and the second end surface, and electrically connected to the plurality of internal electrode layers; wherein
when the base body is divided into an inner layer defined by an internal electrode layer closest to the first main surface and an internal electrode layer closest to the second main surface among the plurality of internal electrode layers, a first outer layer defined by the inner layer and the first main surface, a second outer layer defined by the inner layer and the second main surface, a first side margin portion defined by the inner layer, the first outer layer, the second outer layer, and the first side surface, and a second side margin portion defined by the inner layer, the first outer layer, the second outer layer, and the second side surface, the dielectric layers in each of the inner layer, the first outer layer, and the second outer layer include main crystal grains including barium and titanium, and the dielectric layers in each of the inner layer, the first outer layer, and the second outer layer further include, with respect to 100 parts by mol of titanium, nickel in an amount of about 0.2 parts by mol or more and about 3.0 parts by mol or less, and at least one rare earth element selected from yttrium, praseodymium, neodymium, samarium, europium, gadolinium, terbium, dysprosium, holmium, erbium, thulium, ytterbium, and lutetium in an amount of about 0.6 parts by mol or more and about 2.0 parts by mol or less; and
when an inner region is defined as a region surrounded by planes spaced inward by about 50 μm from an interface at which each of the first outer layer, the second outer layer, the first side margin portion, and the second side margin portion is in contact with the inner layer, a magnesium content with respect to 100 parts by mol of titanium is about 0.05 parts by mol or less in the dielectric layers in the inner region.

2. The multilayer ceramic capacitor according to claim 1, wherein the dielectric layers in each of the first outer layer, the second outer layer, and the inner layer include, with respect to 100 parts by mol of titanium include manganese in an amount of about 0.08 parts by mol or more and about 0.40 parts by mol or less, silicon in an amount of about 0.6 parts by mol or more and about 2.0 parts by mol or less, aluminum in an amount of about 0.04 parts by mol or more and about 0.30 parts by mol or less, and vanadium in an amount of about 0.04 parts by mol or more and about 0.20 parts by mol or less.

3. The multilayer ceramic capacitor according to claim 1, wherein the dielectric layers in each of the first outer layer, the second outer layer, and the inner layer include barium in an amount of about 99.5 parts by mol or more and about 101.5 parts by mol or less, with respect to 100 parts by mol of titanium.

4. The multilayer ceramic capacitor according to claim 1, wherein
the main crystal grains in the dielectric layers in each of the first outer layer, the second outer layer, and the inner layer include Ni-containing grains including a low-Ni-concentration region, and a high-Ni-concentration region in which a Ni concentration is about 1.3 times or more than that of the low-Ni-concentration region; and
a number ratio of the Ni-containing grains in the main crystal grains is about 4% or more.

5. The multilayer ceramic capacitor according to claim 4, wherein the Ni-containing grains include the high-Ni-concentration region in an area ratio of about 9% or more.

6. The multilayer ceramic capacitor according to claim 4, wherein a content of a rare earth element (Re) with respect to 100 parts by mol of titanium in the high-Ni-concentration region is about 1.3 times or more than a content of the rare earth element with respect to 100 parts by mol of titanium in the low-Ni-concentration region.

7. The multilayer ceramic capacitor according to claim 1, wherein
the first side margin portion and the second side margin portion include titanium, and further include at least one of about 1.00 part by mol or more and about 3.00 parts by mol or less of magnesium and about 0.50 parts by mol or more and about 2.00 parts by mol or less of manganese with respect to 100 parts by mol of titanium (Ti); and
a total content of magnesium and manganese is about 5.00 parts by mol or less.

8. The multilayer ceramic capacitor according to claim 1, wherein the internal electrode layers include nickel.

9. The multilayer ceramic capacitor according to claim 1, wherein each of the pair of external electrodes extends around the respective first end surface and second end surface and partially covers the first main surface, the second main surface, the first side surface, and the second side surface.

10. The multilayer ceramic capacitor according to claim 1, wherein a dimension of the multilayer ceramic capacitor in the length direction is about 0.2 mm or more and about 1.2 mm or less, a dimension of the multilayer ceramic capacitor in the width direction is about 0.1 mm or more and about 0.7 mm or less, and a dimension of the multilayer ceramic capacitor in the thickness direction about 0.1 mm or more and about 0.7 mm or less.

11. The multilayer ceramic capacitor according to claim 1, wherein the main crystal grains include barium titanate.

12. The multilayer ceramic capacitor according to claim 1, wherein the Ni-containing grains are core-shell grains.

13. The multilayer ceramic capacitor according to claim 1, wherein each of the dielectric layers has a thickness of about 1.0 μm or less.

14. The multilayer ceramic capacitor according to claim 1, wherein each of the dielectric layers has a thickness of about 0.4 μm or less.

15. The multilayer ceramic capacitor according to claim 1, wherein a thickness of the dielectric layers in each of the first and second outer layers is about 9.5 μm or more and about 30 μm or less.

16. The multilayer ceramic capacitor according to claim 1, wherein each of the internal electrode layers includes at least one of nickel, copper, silver, or palladium, or an alloy including at least one of nickel, copper, silver, or palladium.

17. The multilayer ceramic capacitor according to claim 1, wherein each of the pair of external electrodes has a laminated structure including a base layer, a first plated layer, and a second plated layer.

18. The multilayer ceramic capacitor according to claim 17, wherein the base layer includes at least one of nickel or copper.

19. The multilayer ceramic capacitor according to claim 17, wherein the first plating layer is a nickel plating layer.

20. The multilayer ceramic capacitor according to claim 17, wherein the second plating layer is a tin plating layer.

* * * * *